(12) United States Patent
Chan et al.

(10) Patent No.: US 12,666,269 B2
(45) Date of Patent: Jun. 23, 2026

(54) METHODS AND SYSTEMS FOR ALLOWING DEVICE TO SEND AND RECEIVE DATA

(71) Applicant: Pismo Labs Technology Limited, Kowloon (HK)

(72) Inventors: Alex Wing Hong Chan, Tai Tam (HK); Ho Ming Chan, Quarry Bay (HK); Yu Yeung, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 554 days.

(21) Appl. No.: 17/730,210

(22) Filed: Apr. 27, 2022

(65) Prior Publication Data

US 2022/0255933 A1 Aug. 11, 2022

Related U.S. Application Data

(63) Continuation-in-part of application No. 17/772,138, filed as application No. PCT/IB2020/062469 on Dec. 28, 2020, now Pat. No. 12,604,197.

(51) Int. Cl.
H04W 12/72 (2021.01)
H04L 9/40 (2022.01)
(Continued)

(52) U.S. Cl.
CPC ............. H04W 12/72 (2021.01); H04L 41/08 (2013.01); H04L 63/0876 (2013.01); H04W 4/80 (2018.02)

(58) Field of Classification Search
CPC ....... H04W 12/72; H04W 4/80; H04W 12/03; H04W 12/50; H04W 12/71; H04W 88/02;
(Continued)

(56) References Cited

U.S. PATENT DOCUMENTS 7,546,632 B2 * 6/2009 Stieglitz ................. H04L 63/20
713/168
9,250,974 B1 * 2/2016 Estes ..................... G06F 9/5077
(Continued)

FOREIGN PATENT DOCUMENTS

CN       104579733 A       4/2015
CN       107846668 A       3/2018
(Continued)

OTHER PUBLICATIONS

International Search Report in International Application No. PCT/IB2020/062469, mailed on Sep. 28, 2021.
(Continued)

*Primary Examiner* — Fatoumata Traore
*Assistant Examiner* — Carlton Johnson
(74) *Attorney, Agent, or Firm* — Hershkovitz & Associates, PLLC; Abe Hershkovitz

(57) ABSTRACT

The present invention discloses a method and system for configuring an electronic device through a management device. When the management device is coupled to the electronic device and the electronic device is not able to communicate with a server, the method and system detect an identity of the electronic device and configure the electronic device according to the identity with a configuration. The configuration may further comprise authentication information, routing policy, energy policy and any information to configure the electronic device or to configure the management device for electronic device. The method and system also allow the electronic device to send data to and to receive data from the server through the management device. The method and system may also diagnose the electronic device before configuring the electronic device.

20 Claims, 20 Drawing Sheets

(51) Int. Cl.
  *H04L 41/08*     (2022.01)
  *H04W 4/80*     (2018.01)
(58) Field of Classification Search
  CPC .... H04W 12/35; H04L 41/08; H04L 63/0876;
                H04L 63/0272; H04L 63/164
  See application file for complete search history.

(56)                References Cited

U.S. PATENT DOCUMENTS

| | | | | |
|---|---|---|---|---|
| 9,658,895 | B2 * | 5/2017 | Breternitz | G06F 9/5066 |
| 2006/0146744 | A1 * | 7/2006 | Vasudevan | H04W 36/02 370/328 |
| 2009/0323516 | A1 * | 12/2009 | Bhagwan | H04L 41/0856 370/216 |
| 2013/0185813 | A1 * | 7/2013 | Shim | H04W 12/06 726/29 |
| 2013/0288601 | A1 * | 10/2013 | Chhabra | H04L 41/0846 455/41.2 |
| 2016/0248649 | A1 | 8/2016 | Song | |
| 2017/0146969 | A1 | 5/2017 | Yamada et al. | |
| 2017/0195180 | A1 * | 7/2017 | Ng | H04L 12/4633 |
| 2017/0289788 | A1 * | 10/2017 | Lalwaney | H04W 8/24 |
| 2018/0285177 | A1 * | 10/2018 | Kvitko | G06Q 30/012 |
| 2019/0089592 | A1 * | 3/2019 | Li | H04L 49/65 |
| 2020/0112549 | A1 | 4/2020 | Guerrero et al. | |

FOREIGN PATENT DOCUMENTS

| | | | | | |
|---|---|---|---|---|---|
| CN | 107920426 | A | * | 4/2018 | H05K 3/225 |
| CN | 110276191 | A | * | 9/2019 | G06F 21/44 |
| WO | WO-2011117193 | A2 | * | 9/2011 | H04L 41/042 |

OTHER PUBLICATIONS

Written Opinion of the International Search Authority in International Application No. PCT/IB2020/062469, mailed on Sep. 28, 2021.
English Language Abstract of CN107846668A (Mar. 27, 2018).
English Language Abstract of CN104579733A (Apr. 29, 2015).

* cited by examiner

Connecting or coupling the management device to an electronic device ~401

Connecting the management device to a network ~602

Establishing a connection between the electronic device and the network through the management device ~603

Receiving a configuration ~604

Configuring the electronic device ~404

Detecting an identity information of the electronic device — 402

Sending the identity information to an enterprise server — 702

Receiving a configuration from the enterprise server — 703

Configuring the electronic device — 404

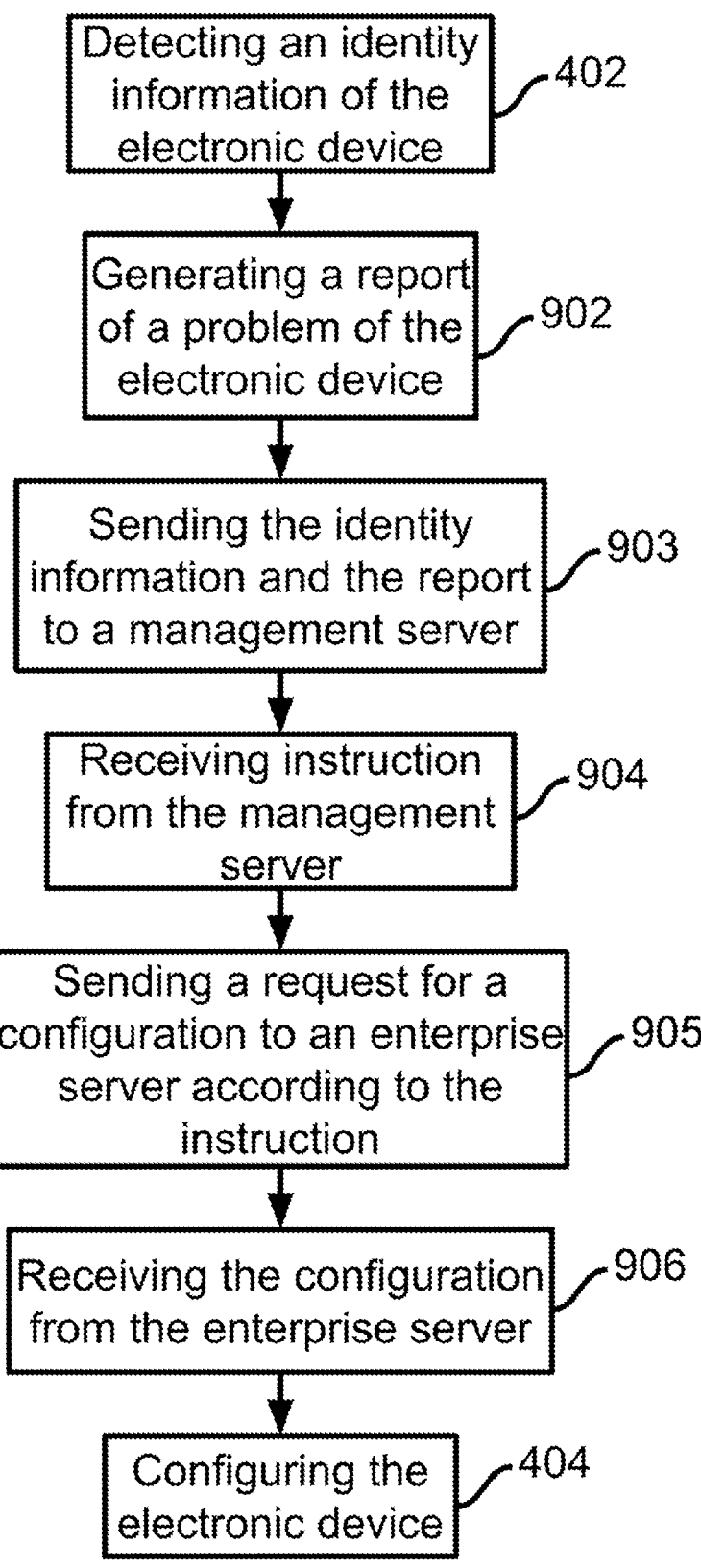

Detecting an identity information of the electronic device — 402

Generating a report of a problem of the electronic device — 902

Sending the identity information and the report to a management server — 903

Receiving instruction from the management server — 904

Sending a request for a configuration to an enterprise server according to the instruction — 905

Receiving the configuration from the enterprise server — 906

Configuring the electronic device — 404

Fig. 9

Receiving a configuration — 1701

Configure the management device with SSID(s) — 1702

Configure the management device with SSID routing policy — 1703

Configure the electronic device to access the SSID(s) — 1704

Execute routing policy — 1705

METHODS AND SYSTEMS FOR ALLOWING DEVICE TO SEND AND RECEIVE DATA

RELATED APPLICATIONS

This patent application is a non-provisional continuation in-part application, which claims the benefits of and is based on U.S. application Ser. No. 17/772,138 filed on Apr. 27, 2022, which is a 371 National Stage entry of Patent Cooperation Treaty Application No. PCT/IB2020/062469, filed on Dec. 28, 2020, and is related to U.S. application Ser. No. 17/730,208 and U.S. application Ser. No. 17/730,209, both filed on Apr. 27, 2022, the disclosures of which are hereby incorporated by specific reference thereto.

TECHNICAL FIELD

The present disclosure relates in general to the field of computer networks. More particularly, the present disclosure relates to methods and systems in which a management device configures an electronic device with a configuration and provides particularly connectivity to the electronic device in order to fix problems of the electronic device.

BACKGROUND ART

Failure to perform properly of any electronic device, such as a computing device, a networking device, a mobile phone or an internet of things (IoT) device, is common. The electronic device may have one or more problems, such as hardware problems, software problems, and firmware problems. In some cases, a problem may be an external problem to the electronic device, such as a network problem. Further, a user may not be able to describe, to identify or to solve the problem.

Some vendors or enterprises try to resolve problems by asking a user to download a piece of software or to allow remote troubleshooting. However, when the electronic device is unable to connect to the Internet, such download and remote troubleshooting may be difficult to perform.

In another scenario, a hardware problem, such as a temperature issue and a sensor issue, may occur at the electronic device. This may cause the electronic device not to start. In such a situation, the user must have to manually inspect the hardware and/or software of the electronic device. However, the user may not be capable of or maybe unwilling to perform the inspection.

SUMMARY OF INVENTION

According to one of the embodiments, method and system for configuring an electronic device through a management device. When the management device is coupled to the electronic device and the electronic device is not able to communicate with a server, the method and system detect an identity of the electronic device and configure the electronic device according to the identity with a configuration. The configuration may further comprise authentication information, routing policy, energy policy and any information to configure the electronic device or to configure the management device for electronic device. According to one of the embodiments, the method and system also allow the electronic device to send data to and to receive data from the server through the management device. According to one of the embodiments, the method and system may also diagnose the electronic device before configuring the electronic device.

The identity of the electronic device may be based on an International Mobile Equipment Identity (IMEI), and/or an International Mobile Subscriber Identity (IMSI). The method and system may communicate with a SIM bank to retrieve one or more IMSIs of one or more SIM cards. The one or more SIM cards are coupled to one or more SIM card slots of the SIM bank.

BRIEF DESCRIPTION OF DRAWINGS

For a more complete understanding of the present disclosure and its advantages, reference is now made to the following description taken in conjunction with the accompanying drawings, in which like reference numerals represent like parts:

FIG. 9 is a flowchart illustrating processes of one of the embodiments of the present disclosure;

DESCRIPTION OF EMBODIMENTS

Figure 1:
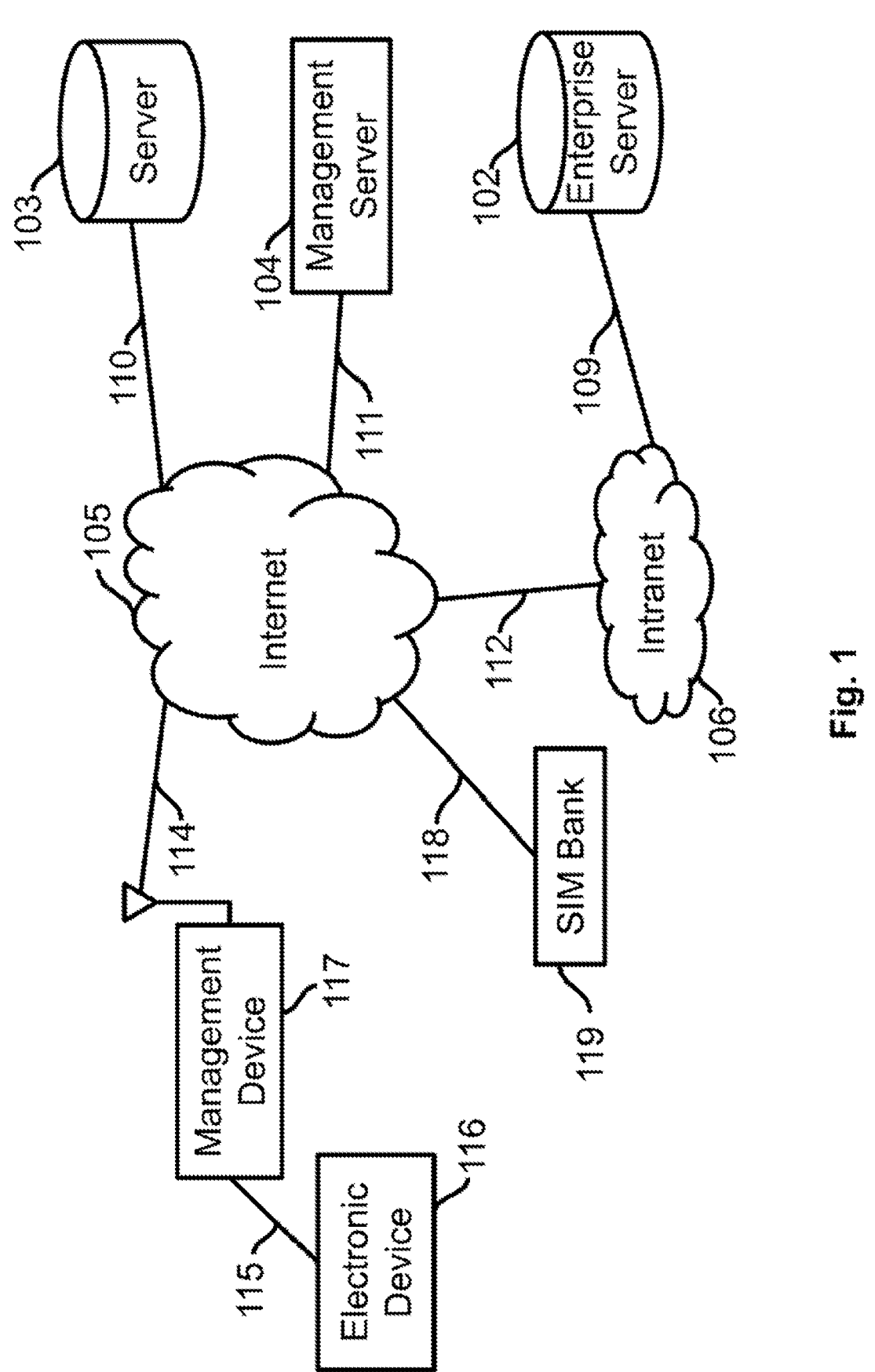
FIG. 1 illustrates a network environment according to various embodiments of the present disclosure.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

FIG. 1 illustrates a network topology according to various embodiments of the present disclosure. Electronic device 116 may be any type of electronic devices. The electronic device may be a refrigerator, an air conditioner, a computing device, a mobile phone, or an Internet of Things (IoT) device. Electronic device 116 may have an interface that allows it to connect to a network, such as Internet 105 or a computing device, such as management device 117.

When electronic device 116 has one or more problems, such as software problems, hardware problems, and other problems, electronic device 116 may not be able to connect to Internet 105.

In one variant, an electronic device, such as electronic device 116, has problems that may not be able to connect to Internet 105 itself. Electronic device 116 may be capable of being connected and configured using out-of-band management technique. electronic device 116 may be managed through a management interface even if electronic device 116 may be turned off, in sleep mode, hibernating, or the network is down. Management device 117 is able to connect to electronic device 116 by using a management port, a serial port or a console port of electronic device 116. Management device 117 will then establish a connection, such as connection 115, with electronic device 116. In this variant, management device 117 is capable of connecting to Internet 105 itself for electronic device 116 and resolving the problems of electronic device 116.

In another variant, electronic device 116 may be using in-band management.

electronic device 116 may be managed through a network, such as Internet 105, using a common protocol, such as telnet, Secure Shell (SSH), Simple Network Management Protocol (SNMP). Management device 117 is able to connect to electronic device 116 by using a network port, a parallel port, or a Universal Serial Bus (USB) port of electronic device 116 through connection 115. In this variant, electronic device 116 will be configured when management device 117 is connected or coupled through connection 115. Accordingly, electronic device 116 is able to establish a connection with Internet 105 through management device 117 by using connections 115 and 114.

Connection 115 may be a wireless connection or a wired connection. Connection 115 may be established by using a management port, a serial port, a console port, an Ethernet, a USB connectivity, a Near Field Communication (NFC) technology, Bluetooth, Wi-Fi direct, or other communication technologies. There is no restriction on type of interface and on type of connection for connecting to electronic device 116. Connection 114 may be a wireless connection or a wired connection and established, such as Ethernet cable, DSL, T1, Wi-Fi, General Packet Radio Service (GPRS), Enhanced Data Rates for GSM Evolution (EDGE), Universal Mobile Telecommunications System (UMTS), Long Term Evolution (LTE), 5G.

In another variant, an electronic device, such as electronic device 116, may be able to connect to Internet 105 directly. However, electronic device 116 may have problems to perform properly. A management device, such as management device 117, is able to connect to electronic device 116 through connection 115. Further, management device 117 may connect to Internet 105 itself through connection 114.

In another variant, management device 117 is used for electronic device 116 that electronic device 116 establishes a connection with Internet 105 through management device 117. Thus, electronic device 116 is then able to connect to Internet 105 via the connection established using management device 117.

Management server 104 may be a secured server, which may belong to and be maintained by a user or an administrator of management server 104. Management server 104 may communicate with management device 117 to provide support and configuration for resolving problems found at electronic device 116.

Enterprise server 102 is a server, which may belong to and be maintained by an enterprise. Enterprise server 102 provides support and configuration to electronic device 116 directly or through management device 117. Alternatively, management device 117 communicates with enterprise server 102 to request for support and to retrieve configuration for electronic device 116 when needed.

Server 103 is a remote server. Electronic device 116 is able to communicate with server 103 through management device 117 after being configured successfully with configuration originated from enterprise server 102. In one variant, electronic device 116 communicates directly with server 103 without passing through management device 117. In another variant, management device 117 communicates directly with server 103.

Management server 104 and server 103 connect to Internet 105 through connections 111 and 110 respectively. Enterprise server 102 connects to Internet 105 through intranet 106 by using connections 109 and 112. The type of the connections 109-112 may be the same or different from connection 114. Enterprise server 102 connects to Internet 105 via intranet 106.

In one variant, management device 117 retrieves configuration from management server 104 or enterprise server 102 for electronic device 116. In this variant, electronic device 116 may not be able to communicate with management server 104 or enterprise server 102 for requesting support and configuration. In another variant, electronic device 116 retrieves the configuration from management server 104 or enterprise server 102 through management device 117. Alternatively, electronic device 116 communicates directly with management server 104 or enterprise server 102 for requesting support and configuration. The configuration is for configuring electronic device 116. Enterprise server 102 provides support and configuration according to the identity information of electronic device 116. Management server 104 provides support and configuration according to the identity information of management device 117. Alternatively, management server 104 provides support and configuration according to the identity of electronic device 116, through management device 117.

Subscriber Identification Module (SIM) bank 119 is an electronic device that comprises a plurality of SIM card slots. One SIM card slot is capable of coupling to one SIM card. Thus, an International Mobile Equipment Identity (IMEI) is linked with each of the SIM card slots of the plurality of SIM card slots. The SIM cards may be from different carrier services. Management device 117 communicates with SIM bank 119 to retrieve International Mobile Subscriber Identities (IMSIs) of the SIM cards coupled to the plurality of SIM card slots. The SIM bank 119 is connected to Internet 105 through at least one connection, such as connection 118. An IMSI comprises a set of wireless network identification values, such as Mobile Country Code (MCC), Mobile Network Code (MNC) and Mobile Subscriber Identification Number (MSIN). Alternatively, electronic device 116 may retrieve IMSIs through management device 117. Electronic device 116 uses the IMSIs to establish one or more cellular connections. Management device 117 forwards authentication requests received from corresponding carrier services to SIM bank 119 for the IMSIs. Management device 117 then forwards authentication responses received from SIM bank 119 to the corresponding carrier services for the IMSIs of the SIM cards. Therefore, connections established using the IMSIs of the SIM cards are maintained by management device 117 for electronic device 116. SIM bank 119 comprises one or more Universal Integrated Circuit Cards (UICCs) for one or more SIM cards. Furthermore, UMTS Subscriber Identity Module (USIM), Removable User Identity Module (RUIM), or CDMA Subscriber Identity Module (CSIM) is applicable for the UICC instead of SIM card in the present disclosure. Further, SIM bank 119 may also comprise one or more Embedded Universal Integrated Circuit Cards (eUICCs) for one or more Embedded Universal Integrated Circuit Cards (eSIMs). eSIM profiles corresponding to the eSIMs may be retrieved from SIM bank 119 by electronic device 116, and management device 117.

Figure 2A:
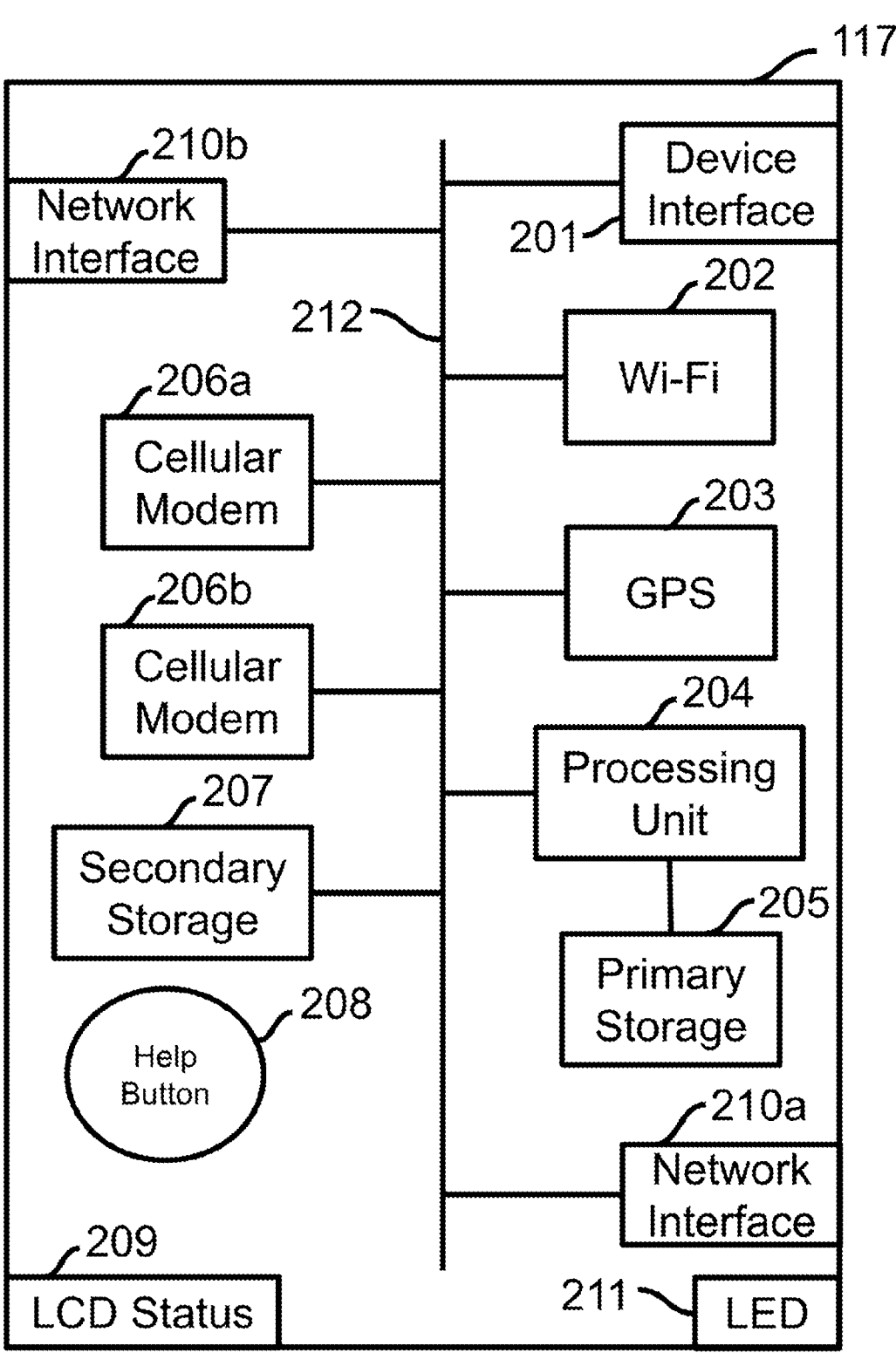
FIG. 2A is a block diagram illustrating components of a management device, according to one of the embodiments of the present disclosure.

FIG. 2A illustrates a block diagram of components of management device 117.

When electronic device 116 is using out-of-band management, it may use a management port, a serial port, a console port, a network port, a parallel port, an Ethernet port, a Power over Ethernet (PoE), or a USB port as device interface 201 to connect to electronic device 116. Moreover, device interface 201 may be implemented by using NFC technology, Bluetooth, Wi-Fi, or other wireless communication technologies for connecting to electronic device 116. There is no limitation on the number and on the type of device interface 201. When electronic device 116 is using in-band management, telnet, SSH, or SNMP may be used through a network, such as Internet 105, via device interface 201 for connecting to electronic device 116.

Management device 117 comprises a plurality of network interfaces, such as network interfaces 210a-b. Each of network interfaces 210a-b may be an Ethernet interface, a frame relay interface, a fiber optic interface, a cable interface, a Digital Subscriber Line (DSL) interface, a token ring interface, a serial bus interface, a USB interface, a Firewire interface, or a Peripheral Component Interconnect (PCI) interface. Management device 117 connects to Internet 105 by using one or more of network interfaces 210a-b. There is no limitation on the number and on the type of network interfaces 210a-b. Network interfaces 210a-b may be configured as local area network (LAN) network interface or wide area network (WAN) network interface. For example, network interface 210a may be a LAN network interface and network interface 210b may be a WAN network interface. In another example, both network interfaces 210a-b are WAN network interfaces.

Management device 117 may further comprise a plurality of cellular modems 206a-b, Wi-Fi module 202, and Global Positioning System (GPS) module 203. The plurality of cellular modems 206a-b is for cellular connectivity, such as GPRS, EDGE, UMTS, LTE, 4G, and 5G. Management device 117 may be capable of connecting to Internet 105 through one or more cellular modems 206a-b. Each of cellular modems 206a-b comprises one or more SIM card slots for coupling SIM cards. Accordingly, an IMEI is linked with each of the one or more SIM card slots. It should be noted that a person having ordinary skill in the art would appreciate that each of the plurality of cellular modems 206a-b may comprise one or more UICCs instead of one or more SIM cards. Moreover, USIM, RUIM, or CSIM is applicable for the UICC instead of SIM card in the present disclosure.

The plurality of cellular modems 206a-b may be capable to utilize one or more eUICCs for one or more eSIMs. Management device 117 may connect to an IEEE 802.11 access point by using a Wi-Fi module, such as Wi-Fi module 202. Management device 117 may also create a Wi-Fi network or hotspot using Wi-Fi module 202. A GPS sensor, such as GPS module 203, is for discovering the location of management device 117. Electronic device 116 may be in a particular region and may need a particular configuration provided by the enterprise of electronic device 116 according to that particular region. Management device 117 may then retrieve that particular configuration for electronic device 116 by using one or more cellular modems 206a-b, or Wi-Fi module 202.

Management device 117 further comprises processing unit 204, primary storage 205, secondary storage 207 and system bus 212. Management device 117 further comprises help button 208, Liquid Crystal Display (LCD) 209 and Light Emitting Diode (LED) 211 optionally. Help button 208, LCD status 209 and LED 211 may be used for operation and operating indication of management device 117.

Processing unit 204 is connected to primary storage 205 directly. Processing unit 204 further connects to Wi-Fi module 202, GPS module 203, cellular modem 26, secondary storage 207, device interface 201 and network interfaces 210a-b via system bus 212. Processing unit 204 controls all operations and functions of management device 117. Help button 208 may be used optionally by a user or administrator. For example, when management device 117 is connected to or coupled to electronic device 116, the user or the administrator may use help button 208 to start diagnosing electronic device 116 in order to allow management device 117 to detect problems. Processing unit 204 may further indicate the functions and operations of management device 117 by using LCD status 209 and LED 211.

There is no limitation that management device 117 must have a plurality of cellular modems 206a-b, a plurality of network interfaces 210a-b, device interface 201, Wi-Fi module 202, GPS module 203, help button 208, LCD status 209 and LED 211.

For example, management device 117 may have none of network interfaces 210a-b, cellular modem 206b, device interface 201, Wi-Fi module 202, GPS module 203, help button 208, LCD status 209 and LED 211. In this example, management device 117 may be able to connect to Internet 105 through cellular modem 206a. Then management device 117 is able to provide Internet 105 network connectivity to electronic device 116 through network interface 210a.

In another example, management device 117 may have none of network interfaces 210a-b, Wi-Fi module 202, GPS module 203, help button 208, LCD status 209 and LED 211. In this example, management device 117 is able to connect to Internet 105 through one or both cellular modems 206a-b. Then management device 117 is able to provide network connectivity to electronic device 116 through device interface 201.

Figure 2B:
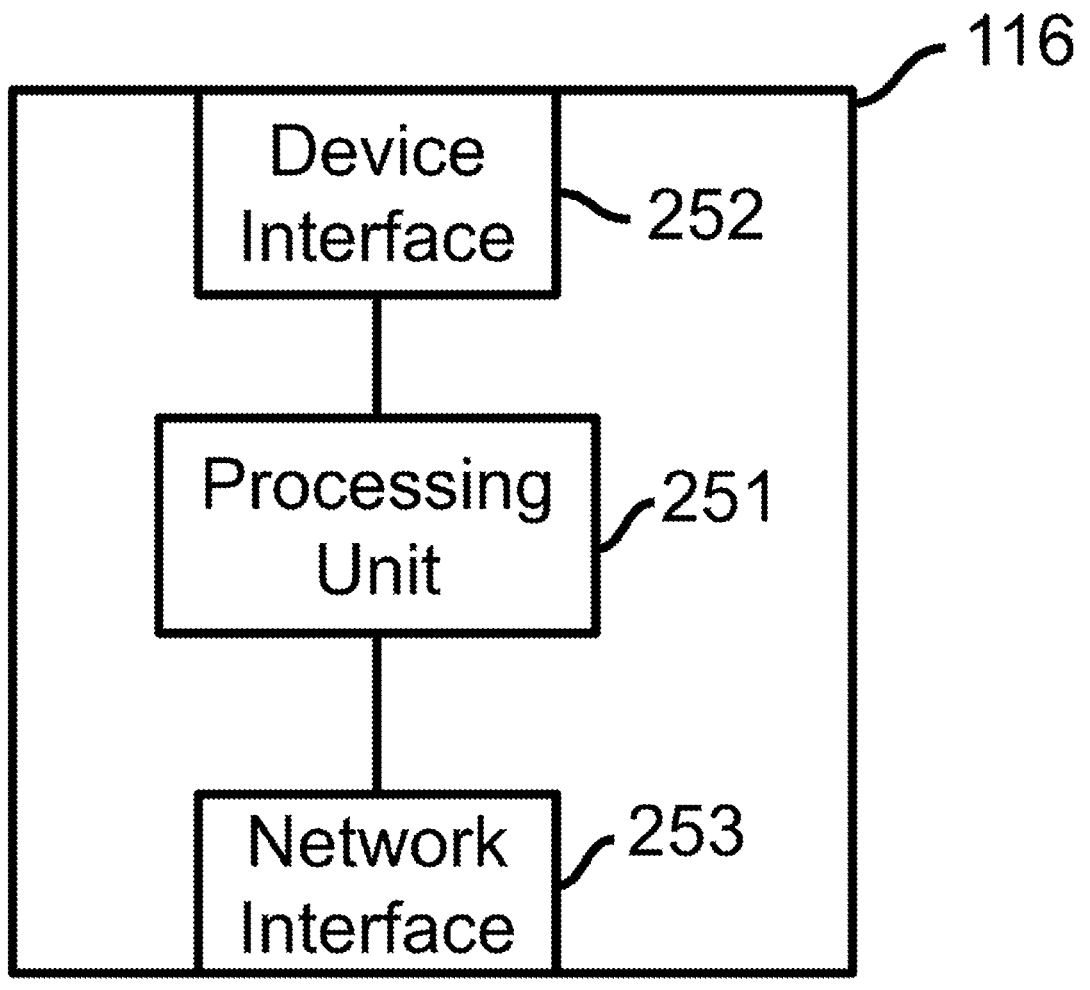
FIG. 2B is a block diagram illustrating components of an electronic device, according to one of the embodiments of the present disclosure.

FIG. 2B illustrates a block diagram of components of electronic device 116. For illustration purposes only, electronic device 116 may be a refrigerator, an air conditioner, or an IoT device. Electronic device 116 is capable of accessing a network. However, electronic device 116 may not be able to allow other electronic devices to get access to the network. Electronic device 116 may have two types of interface, such as device interface 252 and network interface 253. Network interface 253 may be implemented using a network port, an Ethernet port, a PoE port, a parallel port, a management port, a USB port, a WLAN interface, Bluetooth, a NFC technology, infrared, or other communication technologies. Device interface 252 is for directly connecting to another electronic device without going through a network. Implementation of device interface 252 may include using a serial port, point-to-point Bluetooth, crossover Ethernet and a terminal block. Management device 117 may connect to or couple to electronic device 116 through device interface 252 or network interface 253. Management device 117 uses device interface 201 for connecting to or coupling to electronic device 116 through connection 115. Processing unit 251 is for executing programming instructions to operate electronic device 116. Electronic device 116 may further comprise a system bus, one or more storage mediums, sensors, and/or SIM card slots for coupling SIM cards.

Figure 2C:
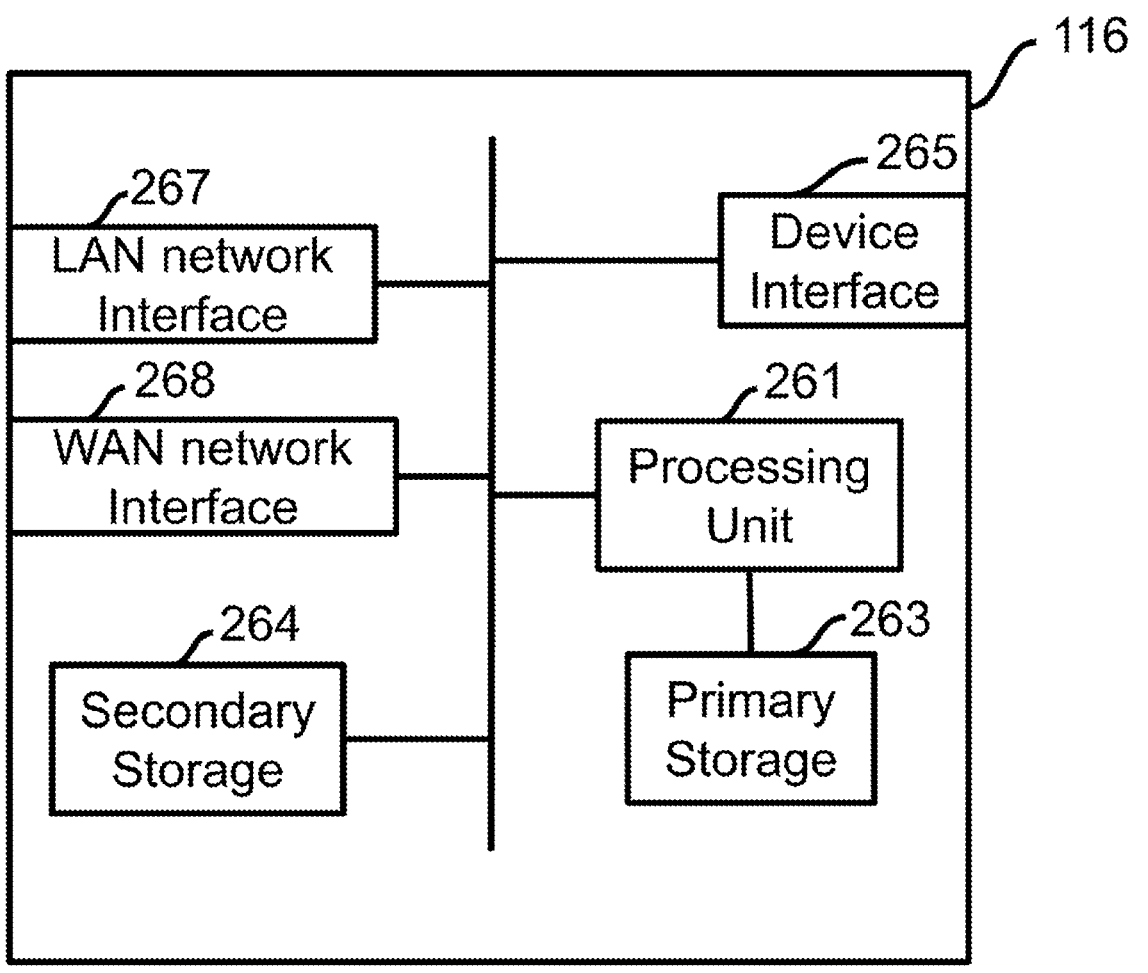
FIG. 2C is a block diagram illustrating components of another variant of the electronic device, according to one of the embodiments of the present disclosure.

FIG. 2C illustrates a block diagram of components of another variant of electronic device 116. Electronic device 116 is another hardware layout of electronic device 116 in comparison to electronic device 116. For illustration purposes only, electronic device 116 may be a hardware layout of electronic device 116, and electronic device 116 may be a computing device, a mobile phone, or a networking device. Electronic device 116 is capable of accessing a network, and providing network to other electronic devices. When electronic device 116 is connected to a network through one or more WAN network interfaces, electronic device 116 allows other electronic devices to get access to the network through one or more LAN network interfaces. Electronic device 116 comprises device interface 265, LAN network interface 267, and WAN interface 268. Device interface 265 performs as device interface 252 of FIG. 2B. LAN network interface 267 and WAN network interface 268 may be implemented using a network port, an Ethernet port, a PoE port, a parallel port, a serial port, a management port, a USB port, a WLAN interface, Bluetooth, a NFC technology, infrared, or other communication technologies. In one particular example, WAN network interface 268 may be a cellular network interface, such as a 4G/5G network interface. There is no limitation on the number and on the type of device interface 265, LAN network interface 267, and WAN interface 268. Electronic device 116 further comprises processing unit 261, primary storage 263 and secondary storage 264. Processing unit 261, secondary storage 264, device interface 265, LAN network interface 267, and WAN interface 268 may be interconnected using a system bus. Processing unit 261 is connected to primary storage 263 directly. Processing unit 261 executes programming instructions stored in primary storage 263 to operate electronic device 116. Management device 117 connects to electronic device 116 through device interface 265 via connection 115 using device interface 201.

Figure 3:
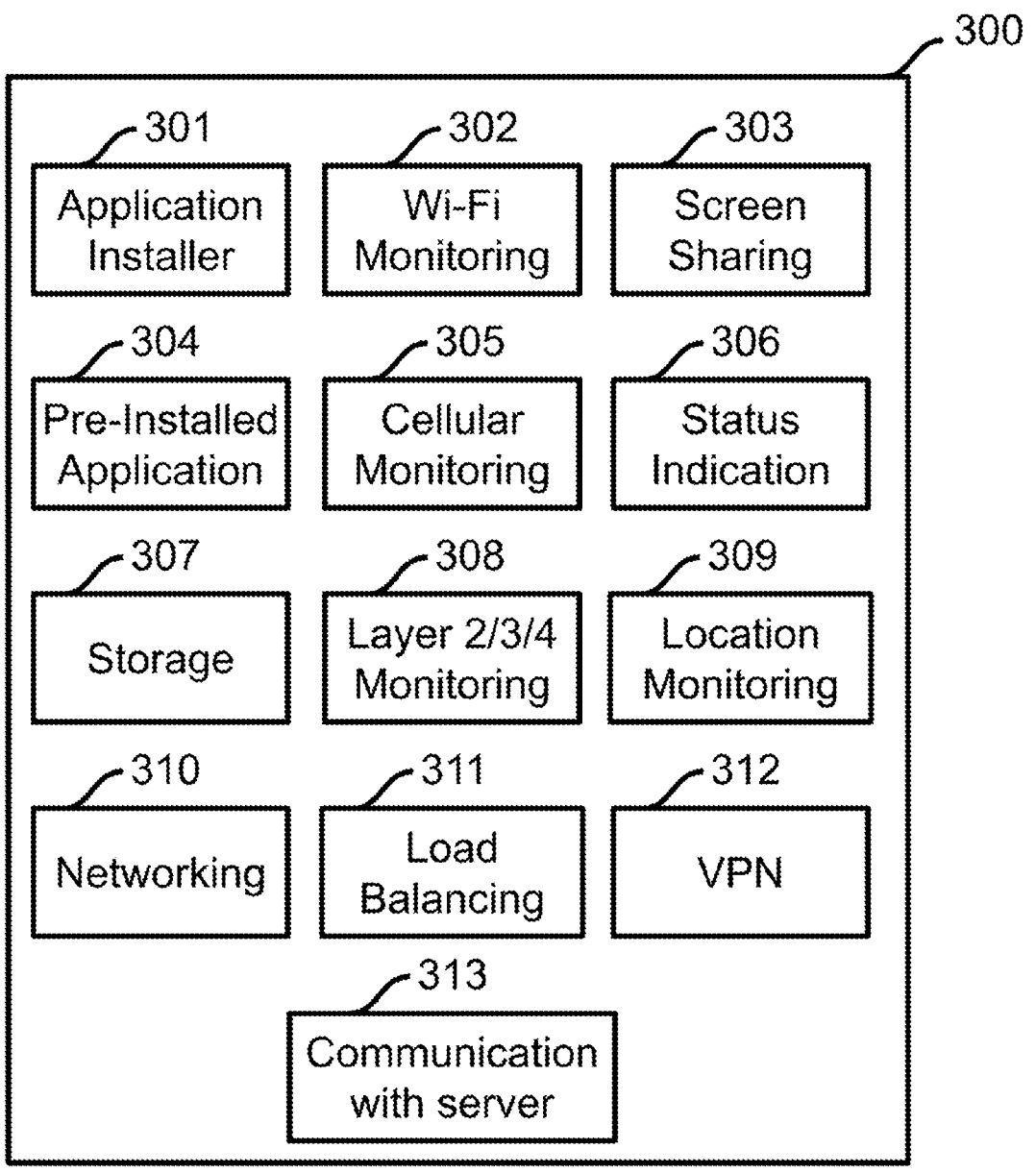
FIG. 3 is a block diagram illustrating a software layout of a management device, according to one of the embodiments of the present disclosure.

FIG. 3 is a diagram of various functionalities stored in primary storage 205 and be performed by processing unit 204 of management device 117. Management device 117 may perform various functions according to these functionalities. These functionalities may be in a form of software. This software may comprise an arrangement of program instructions 300 and installed in management device 117.

Program instructions 300 may comprise the functionalities, such as application installer 301, Wi-Fi monitoring module 302, screen sharing module 303, pre-installed application 304, cellular monitoring module 305, status indication module 306, storage module 307, layer 2/3/4 monitoring module 308, location monitoring module 309, networking module 310, load balancing module 311, Virtual Private Network (VPN) module 312 and communication with server module 313.

Application installer 301 may be used for installing a configuration into electronic device 116. Wi-Fi monitoring module 302 may be used for monitoring a Wi-Fi network or connectivity of Wi-Fi module 202. Pre-installed application 304 may be used for operating management device 117 itself. Diagnosis of electronic device 116 may be performed by pre-installed application 304 to detect hardware and/or software problems.

Cellular monitoring module 305 may be used for monitoring cellular connectivity of cellular modems 206*a-b* in order to detect one or more carrier services of the one or more SIM cards. Cellular monitoring module 305 may then detect network coverage associated with the one or more carrier services to establish one or more cellular connections using the one or more SIM cards with the one or more carrier services. Status indication module 306 may be used optionally for LCD status 209, LED 211, and help button 208. When management device 117 is operating, LCD status 209 and/or LED 211 may indicate the status of the operation. Help button 208 may be used to start diagnosing electronic device 116 after coupling or connecting management device 117. Storage module 307 may be used to manage, allocate, format, and/or partition primary storage 205 and secondary storage 207 in order to operate management device 117. Layer 2/3/4 monitoring module 308 may be used for monitoring different layers of Open Systems Interconnection (OSI) of networking performed by management device 117. Location monitoring module 309 may be used by GPS module 203 for the location of management device 117, or the location of electronic device 116. Networking module 310 may be used for performing network functions of management device 117. Load balancing module 311 and VPN module 312 may be used along with networking module 310 to enhance the performance of the network function of management device 117. Communication with server module 313 may be used for communicating with a server, such as management server 104, server 103, or enterprise server 102.

Electronic device 116 may establish a Virtual Private Network (VPN) connection using VPN module 312 with a server, such as server 103, management server 104, or enterprise server 102, through management device 117. The VPN connection may be established by using IPSec, OpenVPN, WireGuard and/or other technology. The components illustrated in FIG. 2B and the components illustrated in FIG. 2C both are applicable for electronic device 116 for establishing the VPN connection. However, for easy readability, if electronic device 116 is implemented using components illustrated in FIG. 2B, electronic device 116 is not able to provide network connectivity to other devices. On the other hand, if electronic device 116 is implemented using components illustrated in FIG. 2C, electronic device 116 is able to provide network connectivity to other devices.

For example, when IPsec is used, management device 117 may communicate with server 103 to retrieve a VPN configuration information including a pre-shared key, an IP address of server 103 for a VPN connection. Further, management device 117 may send a request to server 103 for retrieving type of encryption algorithm (e.g., TripleDES (3DES), Data Encryption Standard (DES), Advanced Encryption Standard (AES)), type of authentication algorithm (e.g., MD5, SHA1, SHA2), type of Diffie-Hellman (DH) group (e.g., 768-bit group, 1024-bit group, 1536-bit group), and lifetime (e.g., 60 seconds, 3600 seconds, 28800 seconds) for the VPN connection. For illustration purposes, the pre-shared key is "ipsecvpn", the IP address is "188.69.194.45", the type of encryption algorithm is "3DES", the type of authentication algorithm is "MD5", DH group is "768-bit group", and the lifetime is "3600 seconds". When management device 117 retrieves the pre-shared key "ipsecvpn", the IP address "188.69.194.45", the type of encryption algorithm "3DES", the type of authentication algorithm "MD5", DH group "768-bit group", and the lifetime "3600 seconds", management device 117 may be forward this VPN configuration information to electronic device 116 through connection 115. Electronic device 116 may then be configured according to the VPN configuration information received from management device 117, and establish the VPN connection with server 103.

In another variant, the VPN configuration information for configuring the VPN connection may be stored in a local storage medium, such as secondary storage 207. In this variant, management device 117 may send the information for configuring the VPN connection to electronic device 116 without retrieving the VPN configuration information from server 103.

In another example, when OpenVPN is used, management device 117 may communicate with server 103 to send a request for a client configuration file (e.g., client.ovpn). The client configuration "client.ovpn" is to configure electronic device 116 to establish a VPN connection with server 103. When management device 117 receives the client configuration file "client.ovpn", management device 117 may be able send the client configuration file "client.ovpn" to electronic device 116 through connection 115. Further, electronic device 116 may be configured with the client configuration file "client.ovpn" to establish the VPN connection with server 103. In one variant, management device 117 may retrieve a client-certificate, and a username/a password from server 103, and send them to electronic device 116 in order to establish the VPN connection. In another variant, the client configuration file "client.ovpn", or client-certificate and a username/a password may be stored in secondary storage 207. Management device 117 may then send the client configuration file "client.ovpn", or client-certificate and a username/a password for configuring the VPN connection to electronic device 116 through connection 115.

In another example, when WireGuard is used, a key generator may be used in both management device 117 and server 103 to generate a pair of encryption keys—private and public. Management device 117 may send the private key and the public key generated by management device 117 to server 103. Server 103 may send the private key and the public key generated by server 103 to management device 117. It should be noted that both keys must match for encryption and decryption. For example, if encryption is done with the private key, the decryption can be done only with the public key. Management device 117 may then send the private key and the public key received from server 103 to electronic device 116. Further, management device 117 may determine the listening port number of server 103, and send the listening port number to electronic device 116. Electronic device 116 may then be able to use the private key and the public key received from server 103, and the listening port number to establish a VPN connection. In one variant, the private key, the public key, and the listening port number of server 103 may be stored in secondary storage 207. In this variant, management device 117 may not need to communicate with server 103 for configuring the VPN connection. Management device 117 may send the client configuration file "client.ovpn", or client-certificate and a username/a password for configuring the VPN connection to electronic device 116.

In another variant, an aggregated tunnel may be established between electronic device 116 and server 103 through management device 117. In this variant, first, management device 117 may establish multiple connections using a plurality of network interfaces with server 103 and may aggregate the connections to establish an aggregated tunnel. Then, electronic device 116 will communicate with server 103 through the aggregated tunnel.

FIG. 4 to FIG. 15 illustrates different processes according to the embodiments of the present disclosure. FIG. 4 to FIG. 15 should be viewed in conjunction with FIG. 1 for better understanding of the embodiments. An electronic device may perform improperly due to software problems, hardware problems, or other problems. A management device may repair the problems of the electronic device in accordance with different conditions and manners. For illustrative purposes, the electronic device may be electronic device 116, and the management device may be management device 117. Electronic device 116 may have the components illustrated in FIG. 2B or the components illustrated in FIG. 2C.

Figure 4:
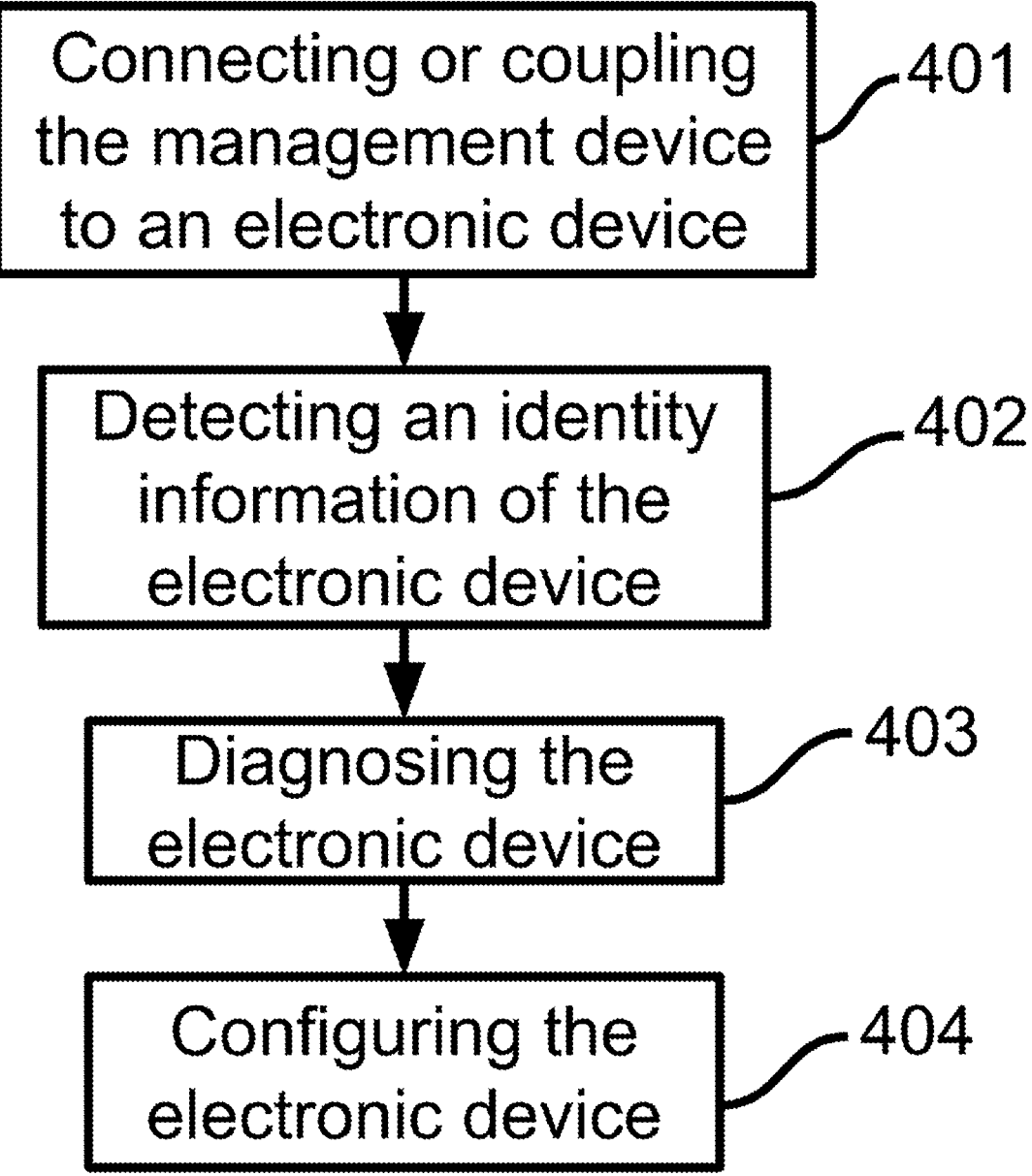
FIG. 4 is a flowchart illustrating processes of one of the embodiments of the present disclosure.

FIG. 4 is a flowchart illustrating a process according to one of the embodiments of the present disclosure. FIG. 4 should be viewed in conjunction with FIG. 1 for better understanding of the embodiments. FIG. 4 illustrates a generic scenario of the present disclosure.

In a network environment, an electronic device, such as electronic device 116, may fail to connect to a network due to problems, such as hardware problems, software problems. Electronic device 116 may not be able to communicate with a server, such as server 103, management server 104 or enterprise server 102, due to the problems. However, management device 117 is still able to connect to or couple to electronic device 116 through a wireless connection or a wired connection, such as connection 115. In this scenario, management device 117 may provide out-of-band connection to electronic device 116 as electronic device 116 is unable to directly connect to server 103, management server 104 and enterprise server 102. Management device 117 is configured to connect to Internet 105 itself using at least one of its own network interfaces. However, electronic device 116 will remain in a status that electronic device 116 is still not able to connect to Internet 105 through management device 117. Management device 117 is configured to detect an identity information of electronic device 116 through connection 115. Further, management device 117 diagnoses electronic device 116 to resolve the problems of electronic device 116. Management device 117 also configures electronic device 116 with a configuration.

In another scenario, electronic device 116 may have problems for connecting to Internet 105 itself. However, when management device 117 is connected to or coupled to electronic device 116 through connection 115, electronic device 116 is then configured to connect to Internet 105 through management device 117 by using connections 115 and 114.

In another scenario, an electronic device, such as electronic device 116 may be able to connect to Internet 105 through a wireless connection or a wired connection. However, electronic device 116 may still have problems, such as software problems. Electronic device 116 may be able to retrieve a configuration itself, however, electronic device 116 may not be able to extract the configuration for itself. The configuration may need to be extracted and provided through management device 117 to electronic device 116. Management device 117 connects to or couple to electronic device 116 through connection 115. Management device 117 then configures electronic device 116. FIG. 4 is described herein for electronic device 116 and management device 117 for illustration purpose only.

In process 401, management device 117 connects to or couples to electronic device 116 through connection 115 by using device interface 201. There is no restriction on the interface type and connection type of management device 117. For example, if electronic device 116 is a refrigerator, management device 117 connects to the refrigerator by using such an interface which is supported by the refrigerator. The refrigerator may have a wireless local area network (WLAN) interface, such as IEEE 802.11. Management device 117 connects to or couples to the refrigerator by using a Wi-Fi connection through device interface 201. In another example, electronic device 116 may be a computer system. The computer system may have one or more of the following interfaces: a network interface, a parallel interface, a serial interface, or a USB interface. Management device 117 connects to the computer system through one or more of these interfaces.

In process 402, management device 117 detects an identity information of electronic device 116. The identity information may comprise a serial number, a model number, a Media Access Control (MAC) address, and/or an identity of a user of electronic device 116.

In process 403, management device 117 diagnoses electronic device 116 to identify whether electronic device 116 has hardware problems or software problems.

In process 404, management device 117 configures electronic device 116. Depending on the problems identified after diagnosis at process 403, management device 117 may re-configure electronic device 116 with the configuration to repair the problems. Additionally, management device 117 may apply a resolving method to electronic device 116 before configuring/re-configuring electronic device 116 at process 404, if there are hardware problems identified after diagnosis at process 403. Applying a resolving method may be described later herein according to FIG. 13. Applying a resolving method may also include rebooting electronic device 116, which is described later according to FIG. 8. Electronic device 116 may then be able to start sending and receiving Internet Protocol (IP) data packets itself or through management device 117. However, electronic device 116 may not be able to send and receive IP data packets when management device 117 is disconnected from electronic device 116.

Figure 5:
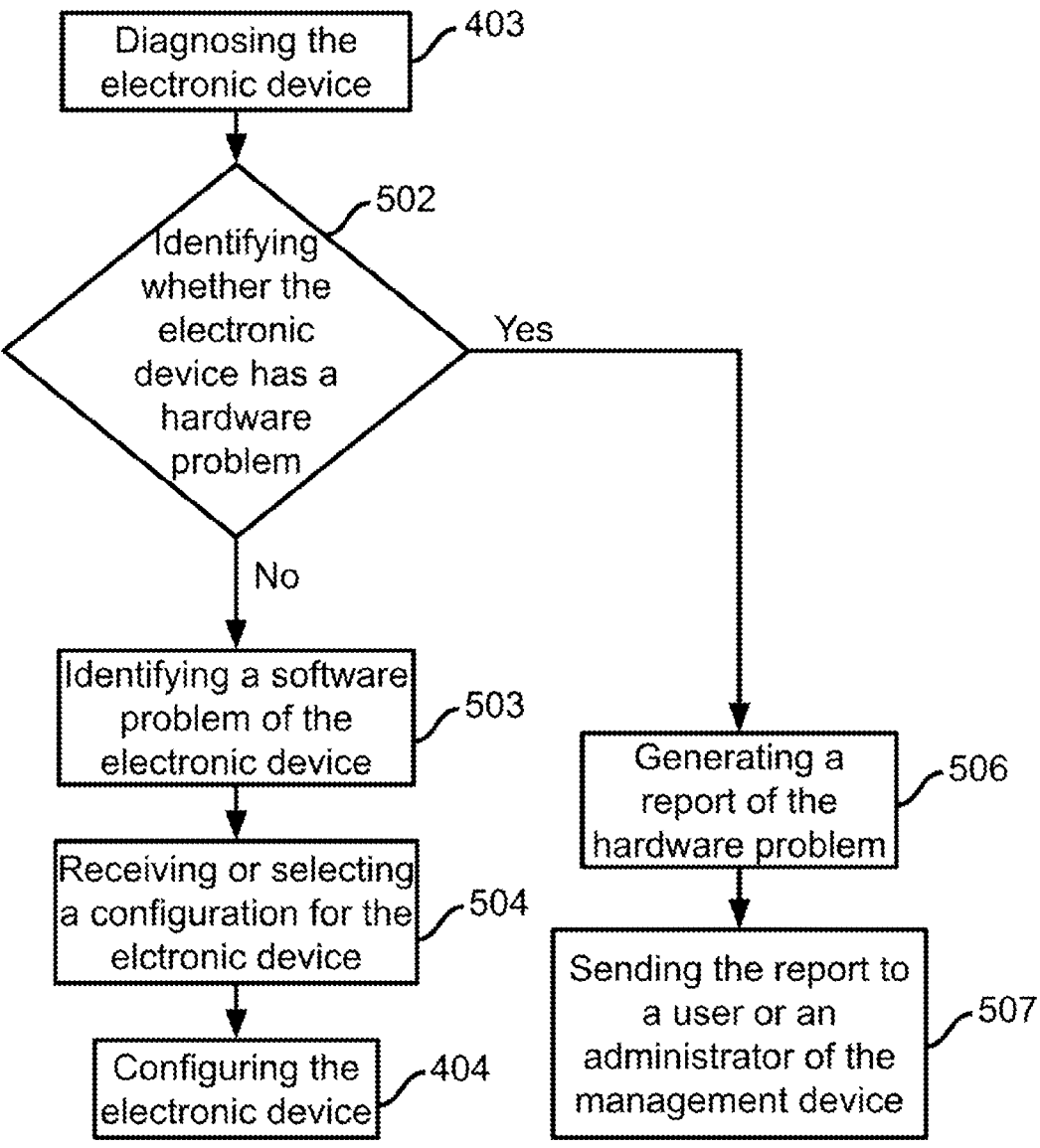
FIG. 5 is a flowchart illustrating processes of one of the embodiments of the present disclosure.

FIG. 5 is a flowchart illustrating a process according to one of the embodiments of the present disclosure. FIG. 5 should be viewed in conjunction with FIG. 1 and FIG. 4 for better understanding of the embodiments. In FIG. 5, management device 117 identifies whether electronic device 116 has hardware problems, software problems, or both problems. According to the problems identified in electronic device 116, management device 117 provides support to electronic device 116.

In process 502, management device 117 identifies whether electronic device 116 has hardware problems.

If management device 117 identifies hardware problems of electronic device 116, management device 117 generates a report of the hardware problems at process 506. The report may comprise the type of the hardware problem, and/or status of the hardware.

In process 507, management device 117 sends the report to a user or an administrator of management device 117. The report may be in character string format, binary format, XML format, or any other format. The report may be sent to the user or to the administrator through a network, Bluetooth, infrared, Short Message Service (SMS), Multimedia Messaging Service (MMS) or email. Alternatively, the report may be displayed to the user or to the administrator through a display module connected to management device 117. Process 507 may be performed optionally in the present disclosure.

If electronic device 116 does not have any hardware problem, electronic device 116 may have software problems. Management device 117 then identifies the software problems at process 503.

In process 504, management device 117 receives a configuration for electronic device 116 from a server, such as enterprise server 102, or management server 104. The configuration is for configuring electronic device 116 to repair the software problems. The configuration may be received by management device 117 using IP data packets, or through one or more SMS messages or MMS messages by using cellular connectivity via one or more of cellular modems 206*a-b*. The configuration is received after sending a request for the configuration to the server. In another variant, the configuration may be received from the server by electronic device 116 directly or through management device 117.

In one variant, electronic device 116 may have both software problems and hardware problems. Management device 117 then performs processes 506 and 503 accordingly. Management device 117 then repairs both the hardware problems and the software problems of electronic device 116. Preferably, management device 117 performs processes 506 and 503 one by one. More particularly, management device 117 repairs the hardware problems first and repairs the software problems later. If the hardware problems are not repaired before repairing the software problems, then these repairments may not bring any effect to electronic device 116. For example, electronic device 116 may have a broken network interface which is a hardware problem. Moreover, the broken network interface may be configured with an unusable configuration which is a software problem. Management device 117 generates a report of the broken network interface and sends the report to a user. The user may then be able to repair the broken network interface according to the report. Further, management device 117 then configures the network interface with a configuration to repair the software problem.

In another variant, management device 117 may not be able to repair the problems found at electronic device 116. Management device 117 then generates a report with the status of the hardware and the status of the software of electronic device 116. The report may be then sent to a user or an administrator of management device 117.

Figure 6:
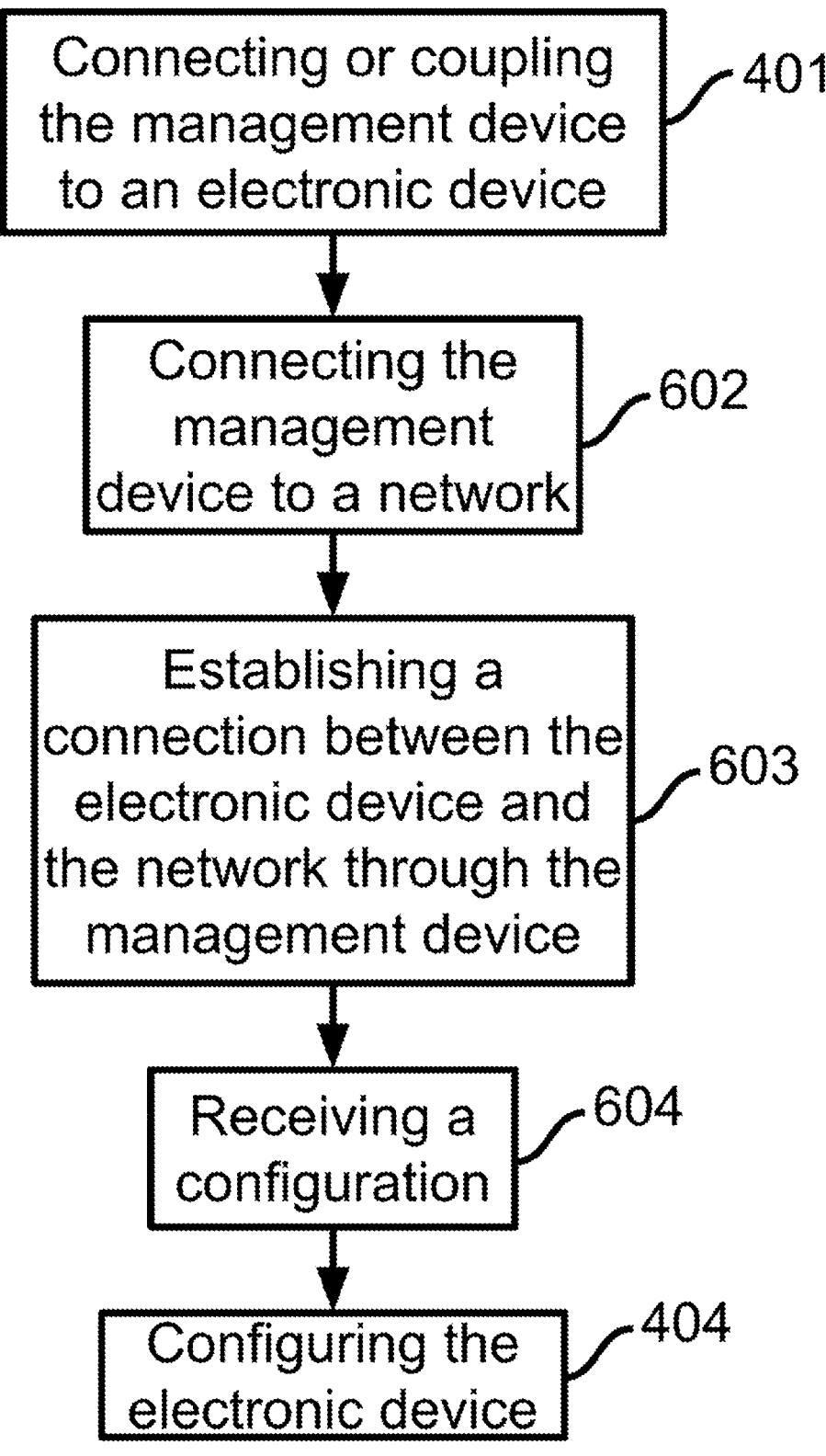
FIG. 6 is a flowchart illustrating processes of one of the embodiments of the present disclosure.

FIG. 6 is a flowchart illustrating a process according to one of the embodiments of the present disclosure. FIG. 6 should be viewed in conjunction with FIG. 1 and FIG. 4 for better understanding of the embodiments. FIG. 6 illustrates when electronic device 116 may not be able to connect to a network due to problems. However, management device 117 connects to the network itself, and establishes a connection between electronic device 116 and the network.

In process 602, management device 117 is connected to Internet 105 through connection 114. In process 603, electronic device 116 establishes a connection with Internet 105 through management device 117 by using connections 115 and 114.

In process 604, electronic device 116 receives a configuration from a server through management device 117 using IP data packets. For receiving the configuration, electronic device 116 may send a request with an identity information of electronic device 116 to the server using IP data packets through management device 117, and the server may then send the configuration to electronic device 116 after receiving the request.

In another variant, when receiving the configuration, electronic device 116 authenticates the configuration whether the configuration is valid or not. The configuration may comprise authentication information for authentication. For example, electronic device 116 authenticates the configuration by extracting contents of the configuration by using a password with the authentication information. If the password is able to extract the contents of the configuration, the configuration is valid. Otherwise, the configuration is not valid. Furthermore, electronic device 116 authenticates the configuration with the server by verifying whether the configuration is received from the server or not. If the configuration is received from the server then the configuration is valid.

Figure 7:
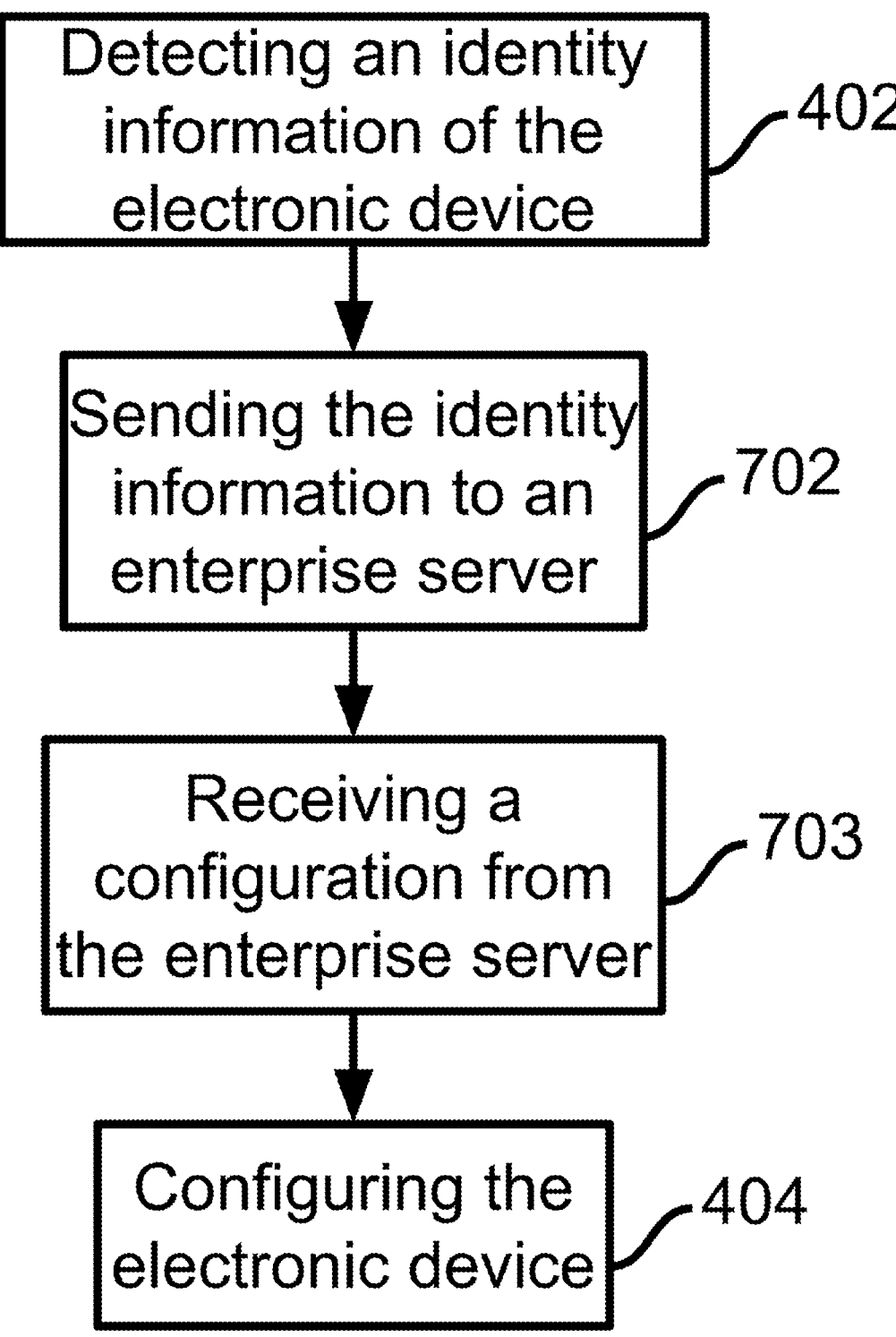
FIG. 7 is a flowchart illustrating processes of one of the embodiments of the present disclosure.

FIG. 7 is a flowchart illustrating a process according to one of the embodiments of the present disclosure. FIG. 7 should be viewed in conjunction with FIG. 1 and FIG. 4 for better understanding of the embodiments.

FIG. 7 illustrates that electronic device 116 may have problems and need to be configured with a configuration to repair the problems. The configuration needs to be retrieved from an enterprise server, such as enterprise server 102. However, electronic device 116 may not be able to receive the configuration from enterprise server 102 due to the problems. Management device 117 receives the configuration from enterprise server 102 for electronic device 116.

In process 702, management device 117 sends the identity information of electronic device 116 with a request for a configuration to enterprise server 102 using IP data packets. Management device 117 sends the identity information with the request in IP data packets by using connections 114, 112 and 109 via Internet 105 and intranet 106.

In process 703, management device 117 receives a configuration from enterprise server 102 using IP data packets, or through one or more SMS messages or MMS messages by using cellular connectivity via one or more of cellular modems 206a-b.

Figure 8:
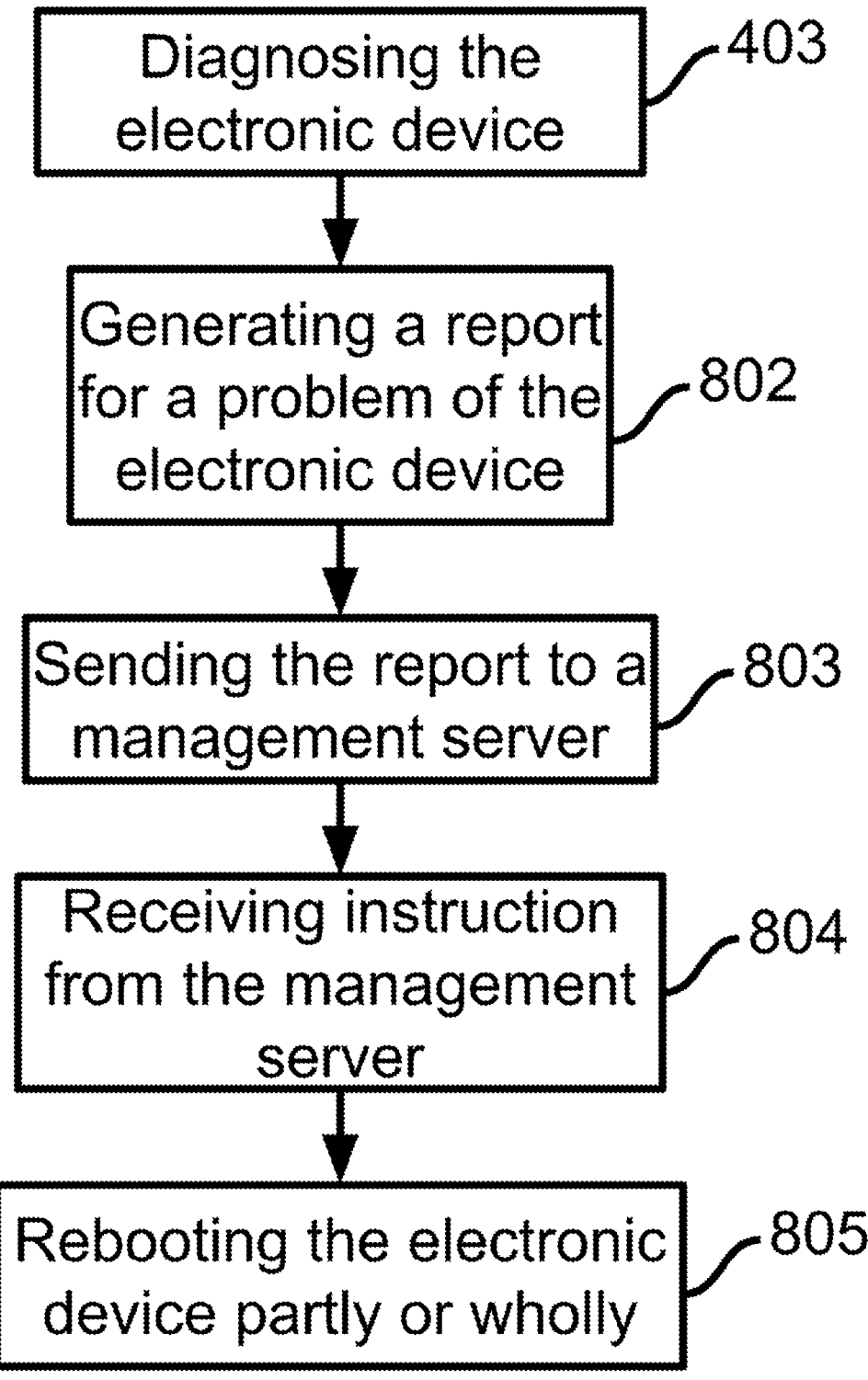
FIG. 8 is a flowchart illustrating processes of one of the embodiments of the present disclosure.

FIG. 8 is a flowchart illustrating a process according to one of the embodiments of the present disclosure. FIG. 8 should be viewed in conjunction with FIG. 1 and FIG. 4 for better understanding of the embodiments.

FIG. 8 illustrates that there may be software problems or hardware problems in electronic device 116 and electronic device 116 may need to be diagnosed to identify the problems. Electronic device 116 then needs to be rebooted partly or wholly, based on the problems identified, to repair the problems. Management server 104 is capable of instructing electronic device 116 through management device 117 to reboot based on the problems identified.

In process 802, management device 117 generates a report of problems of electronic device 116. The report may comprise the status of the hardware, the status of the software, and an identity information of electronic device 116.

In process 803, management device 117 sends the report to management server 104 through Internet 105 by using IP data packets.

In process 804, management device 117 receives instruction from management server 104 by using IP data packets. The instruction is for electronic device 116 to reboot partly or wholly. The instruction may comprise other suggestions to a user or an administrator of management device 117 and/or electronic device 116 for repairing the problems.

In process 805, management device 117 reboots electronic device 116 partly or wholly according to the instruction received from management server 104. The instruction may comprise commands in a script file to reboot electronic device 116. For example, the commands in the script file may be to reboot one or some of the parts of electronic device 116. Alternatively, the commands in the script file may be to reboot the whole parts of electronic device 116. When the commands of the script file are executed by electronic device 116, management device 117 may then reboot electronic device 116.

Management device 117 generates a report of problems found at electronic device 116. Management device 117 then sends an identity information of electronic device 116 with the report to management server 104 in order to receive instruction from management server 104. The instruction may include sending a request for a configuration to enterprise server 102. Management device 117 further sends a request to enterprise server 102 for a configuration to configure electronic device 116. FIG. 9 is a flowchart illustrating a process according to one of the embodiments of the present disclosure. FIG. 9 should be viewed in conjunction with FIG. 1 and FIG. 4 for better understanding of the embodiments.

In process 902, management device 117 generates a report of the problems of electronic device 116. The report may comprise the status of the hardware and the status of the software of electronic device 116.

In process 903, management device 117 sends the identity information of electronic device 116 and the report to management server 104 through connections 114 and 111 via Internet 105.

Management server 104 may then analyse the report received from management device 117 according to a database of instructions stored in management server 104. The database of instructions may comprise the problems and their solutions of electronic device 116. Management server 104 may then send the instruction to management device 117. The instruction may include to send a request for a configuration to enterprise server 102. Additionally, the instruction may be used to cause electronic device 116 to reboot partly or wholly after configuration. In process 904, management device 117 receives the instruction from management server 104.

In process 905, management device 117 sends a request to enterprise server 102 for the configuration according to the instruction through connections 114, 112 and 109 via Internet 105 and intranet 106 using IP data packets.

In process 906, management device 117 receives the configuration from enterprise server 102 through connections 114, 112 and 109 via Internet 105 and intranet 106 using IP data packets.

Figure 10:
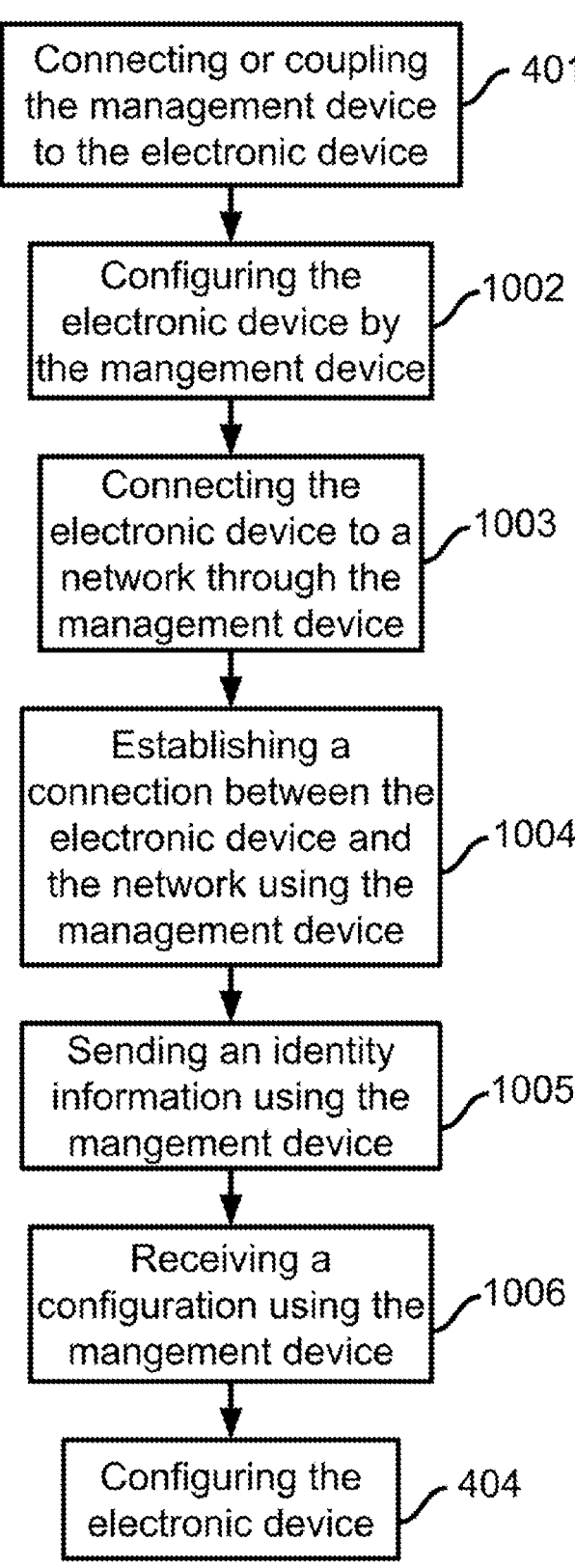
FIG. 10 is a flowchart illustrating processes of one of the embodiments of the present disclosure.

Electronic device 116 may have one or more network interfaces with problems. The one or more network interfaces may be configured with an unusable configuration, and thus electronic device 116 may not be able to connect to a network, such as Internet 105. When management device 117 is connected or coupled to electronic device 116, electronic device 116 is configured by management device 117. Electronic device 116 then establishes a connection with Internet 105 using management device 117. Electronic device 116 is then able to send an identity information to a server and receive a configuration from the server through management device 117. The identity information may be an identity information of electronic device 116. Electronic device 116 then configures/re-configures the one or more network interfaces with the configuration. FIG. 10 is a flowchart illustrating a process according to one of the embodiments of the present disclosure. FIG. 10 should be viewed in conjunction with FIG. 1 and FIG. 4 for better understanding of the embodiments.

In process 1002, electronic device 116 is configured by management device 117, when management device 117 connects or couples to electronic device 116. In process 1003, electronic device 116 connects to Internet 105 using management device 117 by using connections 115 and 114.

In process 1004, a connection is established between electronic device 116 and Internet 105 using management device 117. In process 1005, electronic device 116 sends the identity information with a request for a configuration to the server through the connection established using management device 117.

In process 1006, electronic device 116 receives the configuration using management device 117 from the server. The server may send the configuration according to the identity information after receiving the request.

Figure 11:
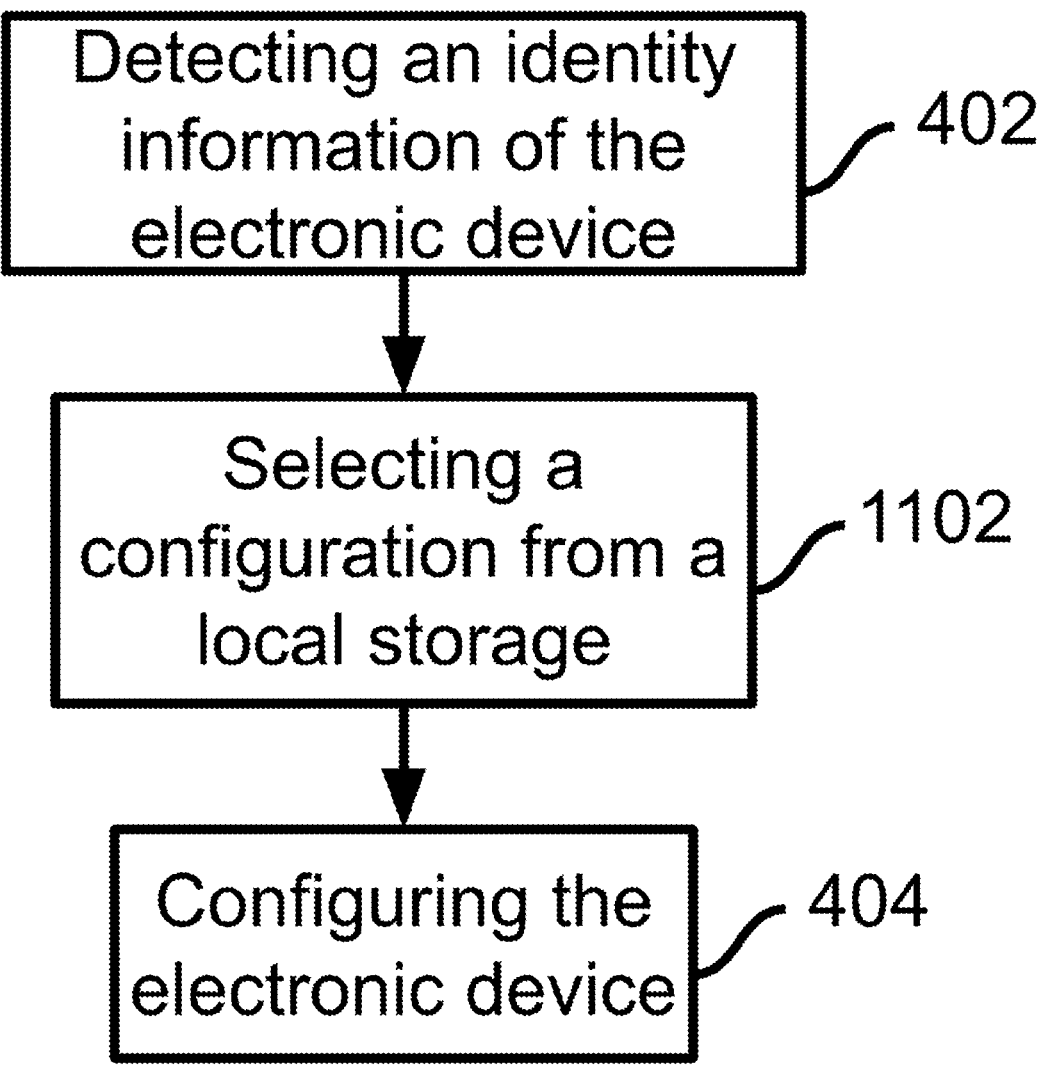
FIG. 11 is a flowchart illustrating processes of one of the embodiments of the present disclosure.

Management device 117 may have already stored a configuration for electronic device 116 in a local storage medium, such as secondary storage 207. The local storage medium may also be connected to or coupled to management device 117 externally by using a network port, a USB port, a NFC technology, Bluetooth, Wi-Fi, or other communication technologies. Management device 117 selects the configuration according to an identity information of electronic device 116. Further, management device 117 configures electronic device 116 with the configuration in order to repair the problems. FIG. 11 is a flowchart illustrating a process according to one of the embodiments of the present disclosure. FIG. 11 should be viewed in conjunction with FIG. 1 and FIG. 4 for better understanding of the embodiments.

In process 1102, management device 117 selects a configuration for electronic device 116 according to the identity information. Management device 117 may comprise a plurality of configurations for different electronic devices in secondary storage 207. Management device 117 then selects the configuration according to the identity information of electronic device 116 from the plurality of configurations.

Figure 12:
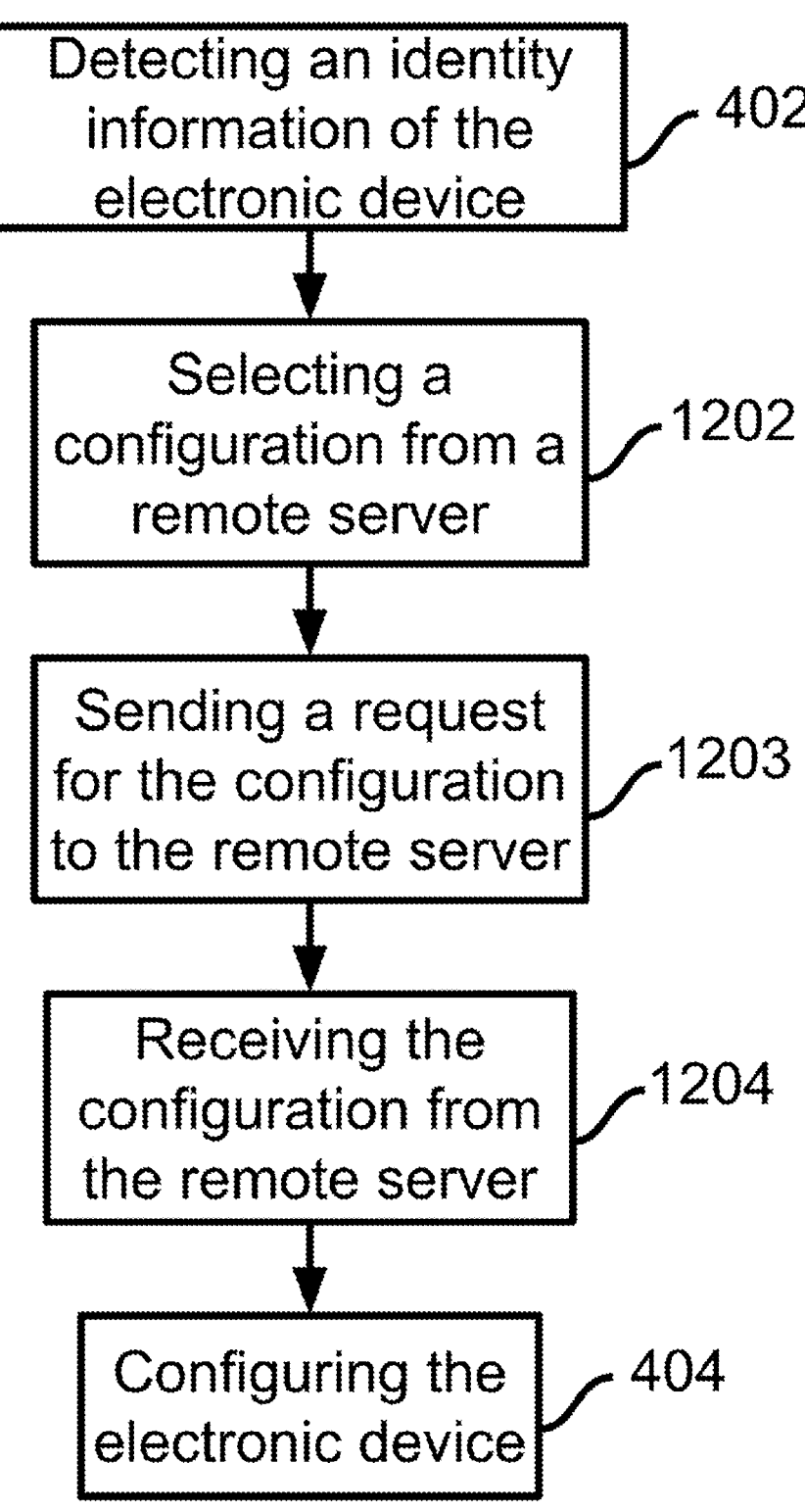
FIG. 12 is a flowchart illustrating processes of one of the embodiments of the present disclosure.

A configuration may be selected from a plurality of configurations stored at a remote server, such as management server 104, if the configuration has been already retrieved and stored at management device 117. Furthermore, management device 117 receives the configuration using IP data packets from management server 104 after sending a request for the configuration selected. Management device 117 then configures electronic device 116 with the configuration to repair the problems. FIG. 12 is a flowchart illustrating a process according to one of the embodiments of the present disclosure. FIG. 12 should be viewed in conjunction with FIG. 1 and FIG. 4 for better understanding of the embodiments.

In process 1202, management device 117 selects a configuration from a plurality of configurations stored at management server 104 according to the identity information of electronic device 116. Alternatively, management device 117 sends the identity information of electronic device 116 to management server 104 for selecting the configuration by management server 104 according to the identity information of electronic device 116. Moreover, management server 104 may have already stored the plurality of configurations for different electronic devices.

In process 1203, management device 117 sends a request to management server 104 for the configuration using IP data packets through connections 114 and 111 via Internet 105.

In process 1204, management device 117 receives the configuration from management server 104 after sending the request using IP data packets through connections 111 and 114 via Internet 105. The configuration may also be received through one or more SMS messages or MMS messages by using cellular connectivity via one or more of cellular modems 206.

In one variant, when receiving the configuration, management device 117 authenticates the configuration whether the configuration is valid or not. The configuration may comprise authentication information for authentication. For example, management device 117 authenticates the configuration by extracting contents of the configuration by using a password with the authentication information. If the password is able to extract the contents of the configuration, the configuration is valid. Otherwise, the configuration is determined invalid. Management device 117 also authenticates the configuration with management server 104. If the configuration is received from management server 104, then the configuration will be valid.

Figure 13:
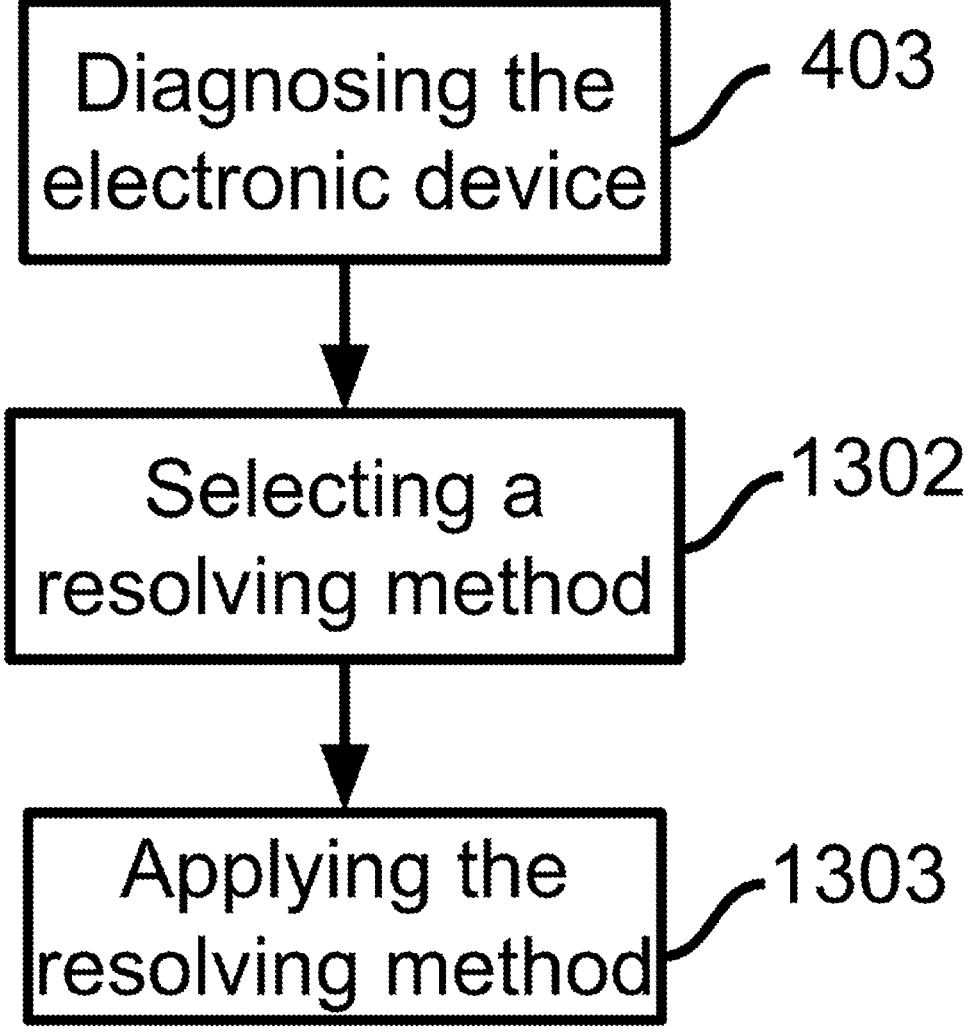
FIG. 13 is a flowchart illustrating processes of one of the embodiments of the present disclosure.

There may be hardware problems in electronic device 116. Management device 117 diagnoses electronic device 116 to identify the hardware problems. A resolving method may need to be applied in electronic device 116 for repairing the hardware problems. Management device 117 applies the resolving method to electronic device 116. FIG. 13 is a flowchart illustrating a process according to one of the embodiments of the present disclosure. FIG. 13 should be viewed in conjunction with FIG. 1 and FIG. 4 for better understanding of the embodiments.

In process 1302, management device 117 selects a resolving method according to the problems. There may be a plurality resolving methods, such as rebooting electronic device 116 partly or wholly, and adjusting temperature by controlling cooling fan speed. The resolving methods may be stored in a local storage medium, such as secondary storage 207, or at a remote server, such as management server 104.

In process 1303, management device 117 applies the resolving method in electronic device 116 through connection 115. For example, management device 117 may command electronic device 116 using a script file to control cooling fan speed to adjust the temperature to repair the problems. In another example, electronic device 116 may freeze and become unresponsive. Rebooting electronic device 116 may fix this problem. Management device 117 may command electronic device 116 to reboot using a script file.

Figure 14:
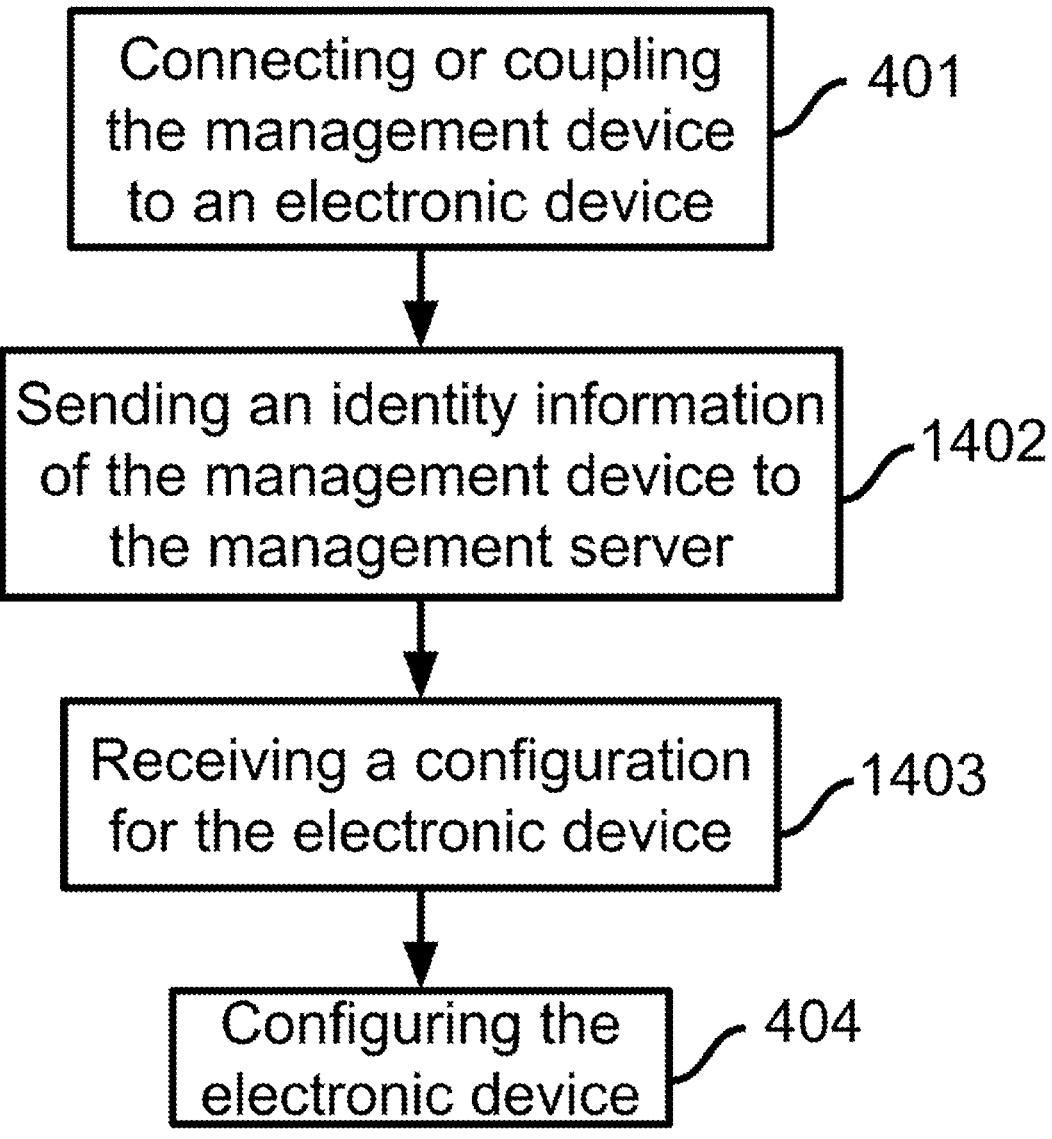
FIG. 14 is a flowchart illustrating processes of one of the embodiments of the present disclosure.

A configuration may need to be retrieved from a remote server, such as management server 104, to configure electronic device 116 and fix the problems. However, electronic device 116 may be unable to retrieve the configuration from management server 104 due to problems. However, management device 117 retrieves the configuration through Internet 105 for electronic device 116 according to an identity information of management device 117. FIG. 14 is a flowchart illustrating a process according to one of the embodiments of the present disclosure. FIG. 14 should be viewed in conjunction with FIG. 1 and FIG. 4 for better understanding of the embodiments.

In process 1402, management device 117 sends an identity information of management device 117 with a request for a configuration of electronic device 116 to management server 104 using IP data packets. The identity information may comprise a serial number, a model number, a MAC address, and/or an identity of a user of management device 117.

In process 1403, management device 117 receives the configuration from the management server 104 using IP data packets, or through one or more SMS messages or MMS messages by using cellular connectivity via one or more of cellular modems 206*a-b*. Management server 104 sends the configuration of electronic device 116 after receiving the request according to the identity information of management device 117. Additionally, management device 117 authenticates the configuration whether the configuration is valid or not. The configuration may comprise authentication information for authentication. For example, management device 117 authenticates the configuration by extracting contents of the configuration by using a password with the authentication information. If the password is able to extract the contents of the configuration, the configuration is valid. Otherwise, the configuration is invalid. Management device 117 also authenticates the configuration with management server 104. If management device 117 determines that the configuration is received from management server 104, then the configuration will be determined valid.

Figure 15:
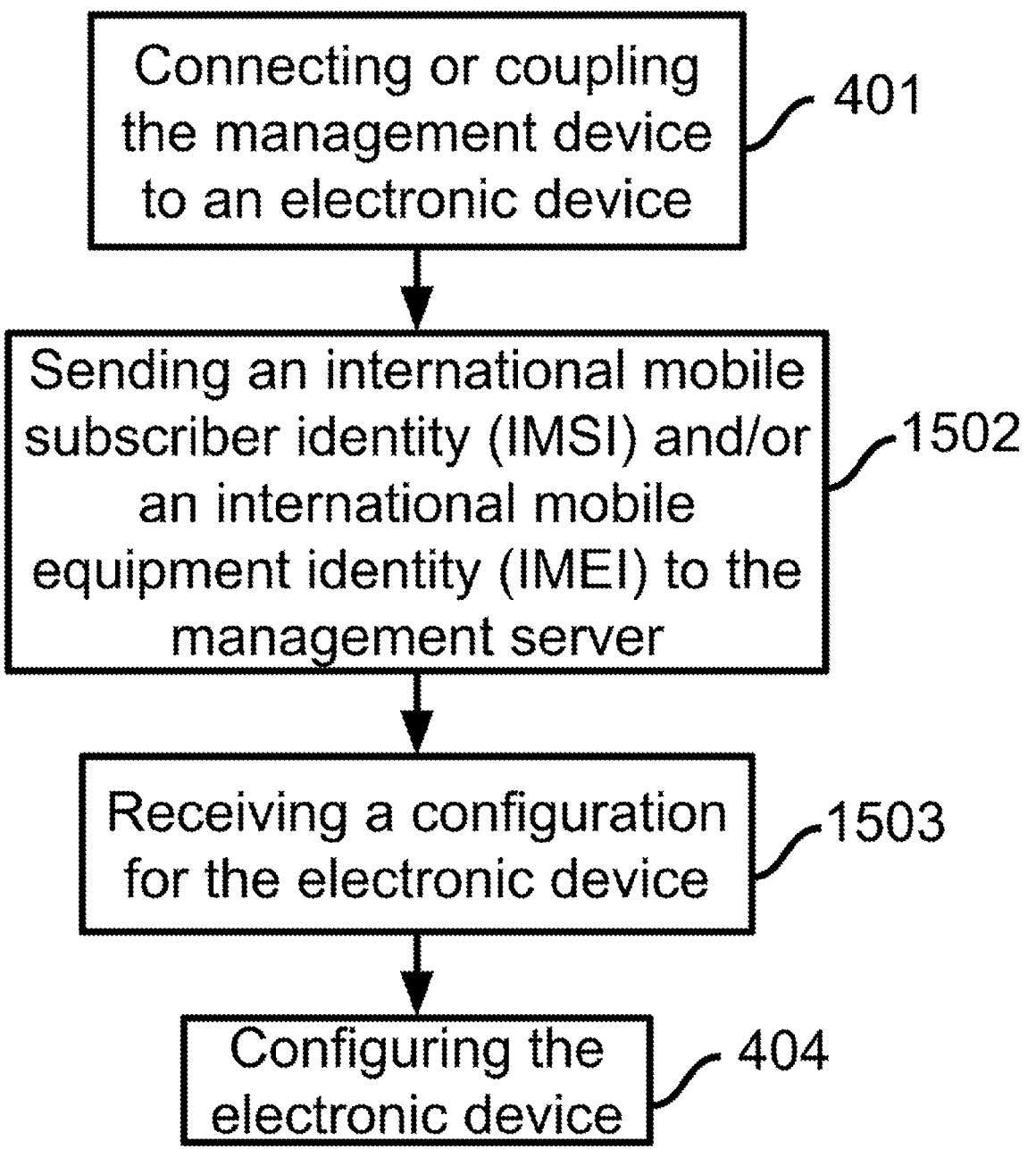
FIG. 15 is a flowchart illustrating processes of one of the embodiments of the present disclosure.

A configuration may need to be retrieved from a remote server, such as management server 104, to configure electronic device 116 to repair problems according to an IMSI and/or an IMEI. The IMSI and/or the IMEI may be used as identity information. FIG. 15 is a flowchart illustrating a process according to one of the embodiments of the present disclosure. FIG. 15 should be viewed in conjunction with FIG. 1 and FIG. 4 for better understanding of the embodiments.

In process 1502, management device 117 sends an IMSI and/or an IMEI to management server 104. The IMSI is an IMSI of a SIM card coupled to a SIM card slot of one of cellular modems 206*a-b* in management device 117, and the IMEI is an IMEI of management device 117. The IMSI and/or the IMEI may be sent with a request for a configuration of electronic device 116. Alternatively, the IMSI may be an IMSI of a SIM card coupled to a SIM card slot of electronic device 116, and the IMEI may be an IMEI of electronic device 116.

In process 1503, management device 117 receives the configuration from management server 104 using IP data packets, or through one or more SMS messages or MMS messages by using cellular connectivity via one or more of cellular modems 206*a-b*. Management server 104 sends the configuration of electronic device 116 to management device 117 after receiving the request according to the IMSI and/or the IMEI.

According to the processes depicted in the various embodiments of the present disclosure, after successfully configuring, re-configuring, and/or resolving the problems, electronic device 116 may be able to communicate with SIM bank 119 either itself or through management device 117. Electronic device 116 may then be able to retrieve one or more IMSIs of one or more SIM cards from SIM bank 119 either itself or through management device 117. Electronic device 116 may then use the MCC, the MNC and the MSIN of the one or more IMSIs to establish one or more cellular connections by using one or more cellular modems. The one or more cellular modems may be coupled to electronic device 116. In another scenario, management device 117 may communicate with SIM bank 119 to utilize one or more SIM cards for establishing one or more cellular connections by using one or more of cellular modems 206*a-b*.

A management device, such as management device 117, may maintain the one or more cellular connections by forwarding authentication requests received from carrier services to SIM bank 119, and forwarding authentication responses received from SIM bank 119 to the carrier services for the one or more IMSIs of the one or more SIM cards.

The components illustrated in FIG. 2B and the components illustrated in FIG. 2C both are applicable to be used for electronic device 116 in the present disclosure. There is no limitation that electronic device 116 is limited only to have the components illustrated in FIG. 2B or is limited only to have the components illustrated in FIG. 2C.

Figure 16:
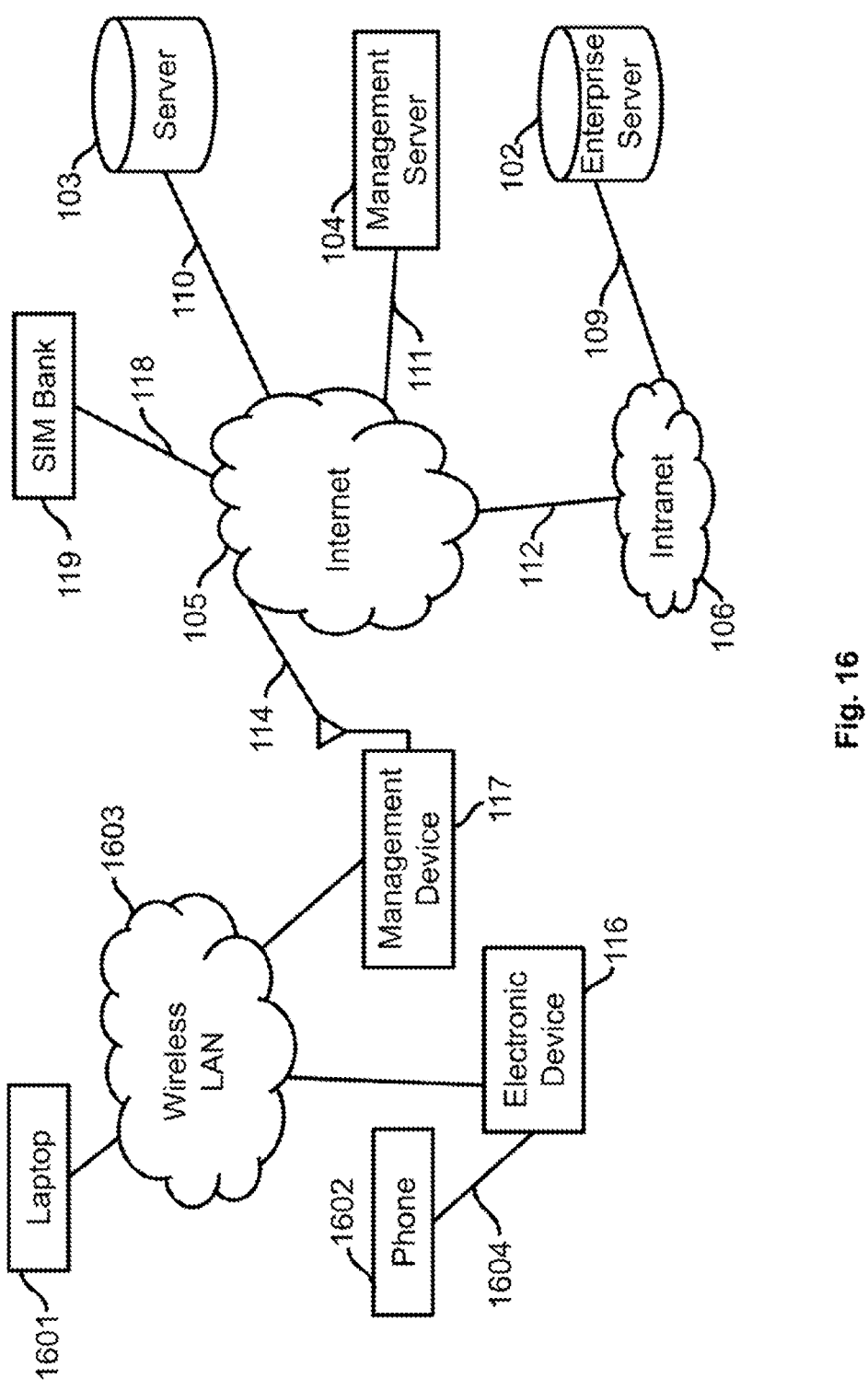
FIG. 16 illustrates a network environment according to various embodiments of the present disclosure.

FIG. 16 illustrates a network topology according to various embodiments of the present disclosure. FIG. 16 is a similar network topology to FIG. 1. In FIG. 16, electronic device 116 is not connected to Internet 105 itself. Management device 117 may have a plurality of WAN network interfaces, for example, network interfaces 210*a-b* and cellular modems 206*a-b*.

In one example, electronic device 116 is capable of providing network connectivity to other devices, such as phone 1602. Phone 1602 is connected to electronic device 116 through connection 1604. The type of connection 1604 may be a wireless connection or a wired connection. Connection 1604 may be established by using a management port, a serial port, a console port, an Ethernet, a USB connectivity, a Near Field Communication (NFC) technology, Bluetooth, Wi-Fi direct, or other communication technologies. Laptop 1601, electronic device 116, and management device 117 are connected to wireless LAN 1603.

Other elements and components of FIG. 16 are identical to the elements and components of FIG. 1.

Routing Policy

Figure 17:
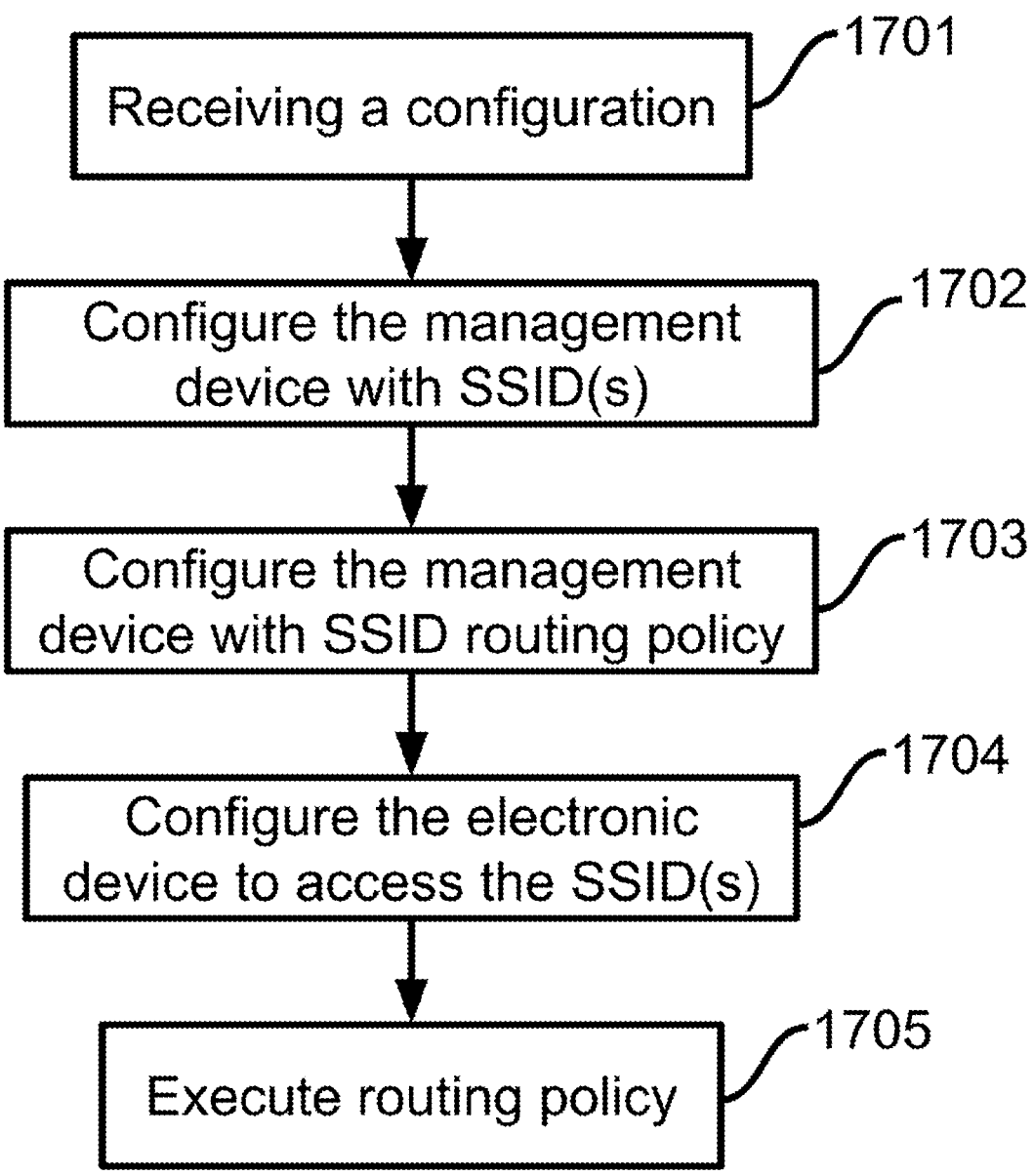
FIG. 17 is a flowchart illustrating processes of one of the embodiments of the present disclosure.

FIG. 17 is a flowchart illustrating a process according to one of the embodiments of the present disclosure. FIG. 17 should be viewed in conjunction with FIG. 16 for better understanding of the embodiments.

When management device 117 receives a configuration to configure electronic device 116, the configuration may include a routing policy. Management device 117 may then extract the routing policy from the configuration. The routing policy may provide instructions for sending or routing IP data packets received from electronic device 116.

Alternatively, electronic device 116 may receive the configuration itself through management device 117. Electronic device 116 may then be configured with the routing policy. In one example, the configuration includes configuration for at least one Service Set Identifier (SSID) and routing policy for the at least one SSID. The routing policy may be based on destination of the IP data packets, or source of the IP data packets.

In process 1701, management device 117 receives a configuration for electronic device 116. The configuration may be received from a server, such as management server 104 or enterprise server 102. Alternatively, the configuration may be retrieved from a local storage medium, such as secondary storage 207. The configuration includes SSID configuration and a routing policy of the SSID.

In process 1702, the processing unit of management device 117 configures management device 117 with SSID(s) based on the SSID configuration. The SSID configuration may include one or more strings to be used as SSID(s), the corresponding authentication password, the corresponding wireless network security type, and the corresponding encryption type. The wireless network security type may be Wired Equivalent Privacy (WEP), Wi-Fi Protected Access (WPA), WPA2, WPA3, and the encryption type may be Advanced Encryption Standard (AES), Temporal Key Integrity Protocol (TKIP). For illustration purposes, the SSID is "Red", the authentication password is "0000000000", and the wireless network security type is WPA2. There is no limitation on the number of SSIDs that are allowed to be created per a configuration.

For example, the configuration may also include another SSID "Blue" and the corresponding authentication password, the corresponding wireless network security type, and the corresponding encryption type.

In process 1703, the processing unit of management device 117 configures the management device 117 based on the routing policy of the SSID. The processing unit will send or route IP data packets received via the SSID based on the routing policy. There is no limitation to the types of routing policy that are stored in the configuration and to be executed by the processing unit of management device 117. For example, management device 117 has two WAN network interfaces, network interface 210*b* and another WAN network interface not illustrated in FIG. 2A. For example, the routing policy is to restrict all IP data packets received via SSID "Red" to be sent using the first WAN network interface and to restrict all IP data packets received via SSID "Blue" to be sent using the second WAN network interface. In another example, IP data packets received via SSID "Red" will be sent via a virtual private network. The virtual private network may be established based on the configuration. In another example, a flow control is implemented to limit the bandwidth of SSID "Red" to a threshold, which may be specified in the configuration. In another example, IP data packets received and transmitted via SSID "Red" will have higher priority than IP data packets received and transmitted via SSID "Blue". Higher priority IP data packets will be processed and transmitted earlier than lower priority IP data packets.

In process 1704, in order to allow electronic device 116 to access a network connected to management device 117, a user or an administrator of electronic device 116 may input the SSID "Red", the wireless network security type WPA2; the encryption type AES, and password "0000000000" to electronic device 116. Then electronic device 116 will be able to authenticate with management device 117 and access the network. In one variant, when management device 117 is coupled to electronic device 116 for out-of-band management, management device 117 may configure electronic device 116 with the SSID "Red", the wireless network security type, the encryption type, and the password. Management device 117 may also configure electronic device 116 to diagnosis and repair problems while performing the out-of-band management.

In process 1705, when IP data packets are being sent and received via the SSID(s), the processing unit of management device 117 performs the routing policy on the IP data packets.

In one example, for illustration purposes only, electronic device 116 provides a network for phone 1602 via connection 1604. Electronic device 116 is also connected to management device via connection 115, which is a wireless connection with SSID "Red". Therefore, phone 1602 is able to access Internet 105 via SSID "Red". IP data packets received and sent by phone 1602 are subject to the routing policy of SSID "Red".

In another example, a user or an administrator of laptop 1601 may input the SSID "Red"; the wireless network security type "WPA2"; the encryption type "AES"; and password "0000000000" to laptop 1601. Then laptop 1601 will be able to authenticate with management device 117 for using wireless LAN 1603. Then laptop 1601 will be able to access Internet 105 via management device.

In one variant, a plurality of WAN network interfaces of management device 117 is capable of forming an aggregated connection with a host, for example, enterprise server 102, reachable through Internet 105. The aggregated connection may be encrypted and may require authentication. The configuration for forming the aggregated connection was included in the configuration received in process 1701. The routing policy may include sending IP data packets received via SSID "Red" through the aggregated connection to enterprise server 102. The aggregated connection may be formed over a plurality of WANs connected to WAN network interfaces of management device 117. This allows a user of laptop 1601 to connect to enterprise server 102 by simply connecting to SSID "Red".

Energy Policy

Figure 18:
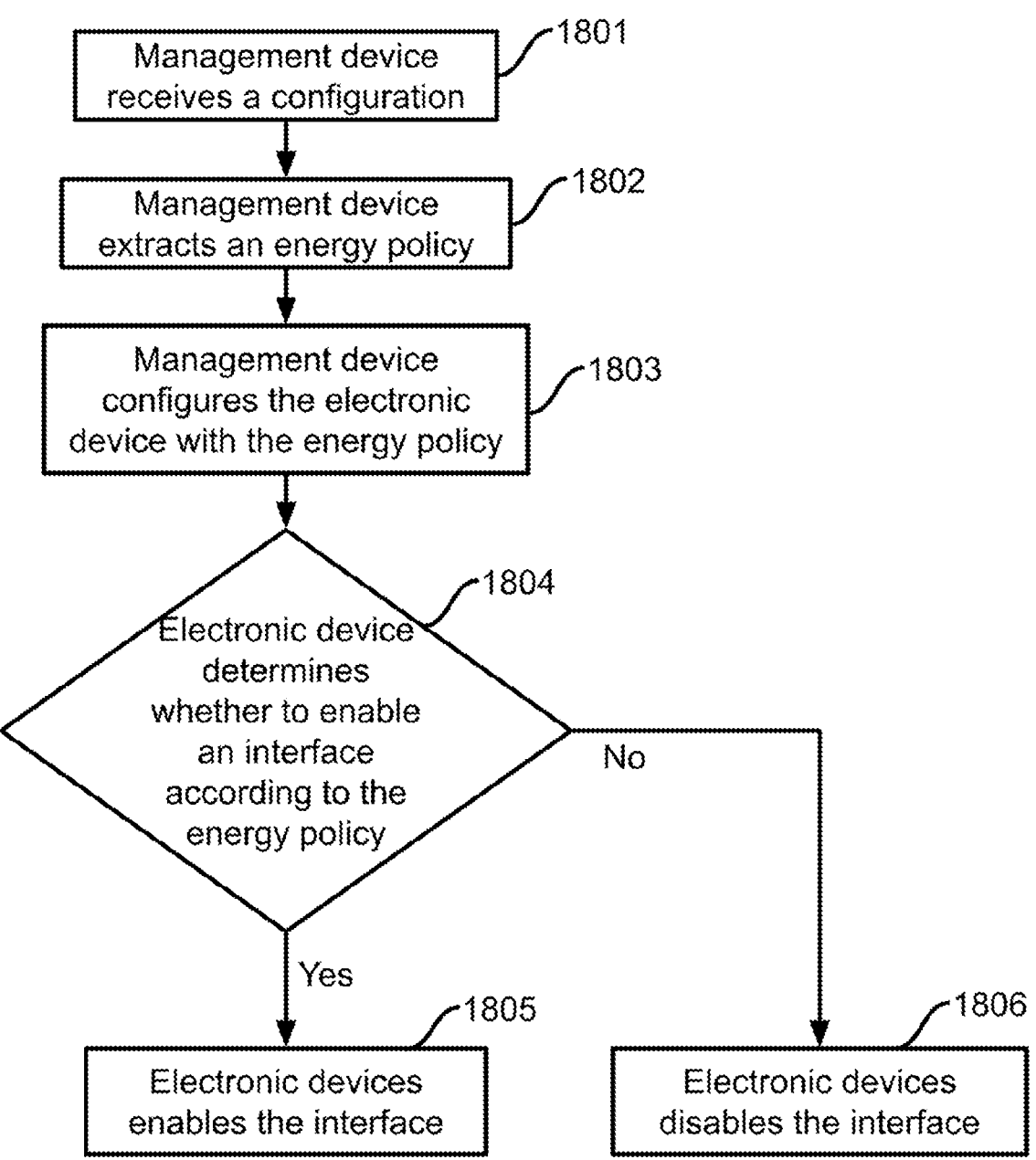
FIG. 18 is a flowchart illustrating processes of one of the embodiments of the present disclosure.

FIG. 18 is a flowchart illustrating a process according to one of the embodiments of the present disclosure. FIG. 18 should be viewed in conjunction with FIG. 16 for better understanding of the embodiments. Electronic device 116 may have the components illustrated in FIG. 2B or in FIG. 2C. For illustration purposes only, components in FIG. 2B are used for discussion. However, there is no limitation that electronic device 116 is limited to have the components illustrated in FIG. 2B.

When management device 117 receives or retrieves a configuration for electronic device 116 in process 1801, the configuration may include an energy policy. The configuration is received from a server, such as management server 104, or retrieved from a local storage medium, such as secondary storage 207.

Management device 117 extracts the energy policy from the configuration in process 1802. The energy policy may be used to configure electronic device 116 to enable or disable device interface 252 of electronic device 116.

In process 1803, management device 117 configures electronic device 116 with the energy policy. The energy policy may be sent to electronic device 116 through connection 115 and network interface 253 or device interface 252.

In process 1804, electronic device 116 determines whether to enable device interface 252 according to the energy policy. The energy policy may be used to determine when electronic device 116 should turn on or off device interface 252, for example, from 8 AM to 14 PM in a day. The energy policy may also be used to instruct electronic device 116 to keep device interface 252 in sleep mode or hibernation. For example, if device interface 252 is not being used for 30 minutes, device interface 252 will be put in sleep mode. It should be noted that the energy policy is not limited to these attributes and parameters mentioned herein.

In process 1805, electronic device 116 enables device interface 252. In process 1806, electronic device 116 disables device interface 252.

In one variant, device interface 252 provides electricity and/or data to another device, by enabling or disabling device interface 252, In one variant, the energy policy is to configure when electronic device 116 should be turned on and off. In this variant, processes 1804-1806 will not be performed. Instead, when processing unit 251 has received the energy policy from management device 117, electronic device 116 may schedule the time to turn itself on and off.

In one variant, electronic device 116 receives energy from management device 117 and processes 1803-1806 are not performed. Instead, management device 117 will turn electronic device 116 on and off based on the energy policy by providing or not providing electricity to electronic device 116. Electronic device 116 may receive electricity from management device 117 through an Ethernet cable using Power over Ethernet (PoE) technique.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

The invention claimed is:

1. A method for configuring an electronic device, the method comprising:

when the electronic device is unable to connect to a first server:

(a) at the electronic device: connecting with a management device;

(b) at the management device: detecting identity information of the electronic device;

(c) at the management device: diagnosing the electronic device to generate a report regarding hardware problems and software problems;

(d) at the management device: establishing an aggregated tunnel via an interconnected network with a second server using the identity information;

(e) at the management device: retrieving a configuration from the second server through the aggregated tunnel or a local storage medium;

(f) when the configuration is retrieved from the second server:

(i) at the management device: establishing at least one connection with the first server via the interconnected network, and sending the report and the identity information to the first server through the at least one connection;

(ii) at the management device: after the report is analyzed according to a database of instructions by the first server, receiving an instruction through the at least one connection from the first server according to the report and the identity information; and (iii) at the management device: sending a request for the configuration to the second server through the aggregated tunnel according to the instruction;

(g) when the configuration is retrieved from the local storage medium: at the management device: selecting the configuration according to the identity information;

(h) at the management device: authenticating the configuration to determine if the configuration is valid;

(i) at the management device: based on the instruction, repairing the hardware problems prior to configuring the electronic device with the configuration to repair the software problems when the configuration is valid; and (j) at the electronic device: after configuring with the configuration, sending and receiving data via the interconnected network through at least one of: (i) at least one network interface of the electronic device and (ii) at least one network interface of the management device;

wherein:

22 the aggregated tunnel is established by aggregating a plurality of connections established between the management device and the second server;

the instruction comprises commands in a script file and suggestions to a user of the management device;

the configuring of the electronic device comprises executing the script file;

the configuration comprises authentication information;

the configuration is authenticated by extracting contents of the configuration by using a password with the authentication information; and the configuration is valid if the password extracts the contents of the configuration.

2. The method of claim 1, wherein the identity information is based on at least one of: a serial number, a model number, an International Mobile Equipment Identity (IMEI), an International Mobile Subscriber Identity (IMSI), a Media Access Control (MAC) address, and an identity of a user.

3. The method of claim 1, wherein the configuration is received using Internet Protocol (IP) data packets.

4. The method of claim 1, wherein the first server and the second server are located remotely from the management device.

5. The method of claim 1, wherein the local storage medium is coupled to the management device using a USB connectivity, a NFC technology, Bluetooth, or Wi-Fi.

6. The method of claim 1, wherein the management device comprises one or more of: a network interface, a cellular modem, a Wi-Fi module, and a Global Positioning System (GPS) sensor.

7. The method of claim 1, wherein:

the management device is configured to provide electricity to the electronic device via a Power over Ethernet (POE);

the management device comprises a help button to diagnose the electronic device; and the management device diagnoses the electronic device when the help button is used.

8. The method of claim 1, further comprising:

at the management device: rebooting the electronic device after configuring with the configuration.

9. The method of claim 1, wherein the report comprises a status of hardware of the electronic device and a status of software of the electronic device.

10. The method of claim 1, wherein the management device is coupled to the electronic device via a management port of the electronic device.

11. A system for configuring an electronic device, management device, wherein the system comprises:

the electronic device; and a management device;

wherein the electronic device comprises:

at least one first processing unit;

at least one first primary transitory storage medium; and at least one first secondary non-transitory storage medium storing program instructions executable by the at least one first processing unit for:

when the electronic device is unable to connect to a first server:

(a) connecting with the management device;

(b) after configuring with a configuration, sending and receiving data via an interconnected network through at least one of: (i) at least one network interface of the electronic device and (ii) at least one network interface of the management device;

wherein the management device comprises:
 at least one second processing unit;
 at least one second primary transitory storage medium; and
 at least one second secondary non-transitory storage medium storing program instructions executable by the at least one second processing unit for:
  (c) detecting identity information of the electronic device;
  (d) diagnosing the electronic device to generate a report regarding hardware problems and software problems;
  (e) establishing an aggregated tunnel via the interconnected network with a second server using the identity information;
  (f) retrieving the configuration from the second server through the aggregated tunnel or a local storage medium;
  (g) when the configuration is retrieved from the second server:
   (i) establishing at least one connection with the first server via the interconnected network, and sending the report and the identity information to the first server through the at least one connection;
   (ii) after the report is analyzed according to a database of instructions by the first server, receiving an instruction through the at least one connection from the first server according to the report and the identity information; and
   iii) sending a request for the configuration to the second server through the aggregated tunnel according to the instruction;
  (h) when the configuration is retrieved from the local storage medium, selecting the configuration according to the identity information;
  (i) authenticating the configuration to determine if the configuration is valid;
  (j) based on the instruction, repairing the hardware problems prior to configuring the electronic device with the configuration to repair the software problems when the configuration is valid;
 wherein:
   the aggregated tunnel is established by aggregating a plurality of connections established between the management device and the second server;
   the instruction comprises commands in a script file and suggestions to a user of the management device;

the configuring of the electronic device comprises executing the script file;
  the configuration comprises authentication information;
  the configuration is authenticated by extracting contents of the configuration by using a password with the authentication information; and
  the configuration is valid if the password extracts the contents of the configuration.
 12. The system according to claim 11, wherein the identity information is based on at least one of: a serial number, a model number, an International Mobile Equipment Identity (IMEI), an International Mobile Subscriber Identity (IMSI), a Media Access Control (MAC), address and an identity of a user.
 13. The system according to claim 11, wherein the configuration is received using Internet Protocol (IP) data packets.
 14. The system according to claim 11, wherein the first server and the second server are located remotely from the management device.
 15. The system according to claim 11, wherein the local storage medium is coupled to the management device using a USB connectivity, a NFC technology, Bluetooth, or Wi-Fi.
 16. The system according to claim 11, wherein the management device comprises one or more of: a cellular modem, a Wi-Fi module, and a Global Positioning System (GPS) sensor.
 17. The system according to claim 11, wherein;
  the management device is configured to provide electricity to the electronic device via a Power over Ethernet (POE);
  the management device comprises a help button to diagnose the electronic device; and
  the management device diagnoses the electronic device when the help button is used.
 18. The system according to claim 11, wherein the at least one second secondary non-transitory storage medium storing program instructions executable by the at least one second processing unit for:
  rebooting the electronic device after configuring with the configuration.
 19. The system according to claim 11, wherein the report comprises a status of hardware of the electronic device and a status of software of the electronic device.
 20. The system according to claim 11, wherein the management device is coupled to the electronic device via a management port of the electronic device.

* * * * *